United States Patent
Hamano et al.

(10) Patent No.: US 8,259,555 B2
(45) Date of Patent: Sep. 4, 2012

(54) OPTICAL PICKUP AND OPTICAL INFORMATION PROCESSING DEVICE

(75) Inventors: Yukiko Hamano, Kanagawa (JP); Hideaki Hirai, Kanagawa (JP); Toshimichi Nasukawa, Iwate (JP); Kazuhiro Umeki, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 472 days.

(21) Appl. No.: 12/531,193

(22) PCT Filed: Apr. 15, 2008

(86) PCT No.: PCT/JP2008/057783
§ 371 (c)(1),
(2), (4) Date: Sep. 14, 2009

(87) PCT Pub. No.: WO2008/136315
PCT Pub. Date: Nov. 13, 2008

(65) Prior Publication Data
US 2010/0135130 A1     Jun. 3, 2010

(30) Foreign Application Priority Data

Apr. 26, 2007  (JP) .................................. 2007-116376
Nov. 2, 2007   (JP) .................................. 2007-286017

(51) Int. Cl.
    *G11B 7/135*    (2006.01)
    *G11B 7/00*     (2006.01)

(52) U.S. Cl. ......... 369/112.13; 369/112.05; 369/112.07; 369/112.23

(58) Field of Classification Search .................. None
See application file for complete search history.

(56) References Cited

U.S. PATENT DOCUMENTS

| | | | |
|---|---|---|---|
| 5,930,214 A | 7/1999 | Kasahara et al. | |
| 6,061,324 A | 5/2000 | Arai et al. | |
| 6,118,749 A | 9/2000 | Arai et al. | |
| 6,243,349 B1 | 6/2001 | Arai et al. | |
| 2001/0017830 A1 | 8/2001 | Arai et al. | |
| 2005/0190679 A1* | 9/2005 | Mimori | 369/112.05 |
| 2006/0171285 A1 | 8/2006 | Ogiwara | |
| 2006/0262694 A1 | 11/2006 | Takeuchi et al. | |
| 2007/0014222 A1 | 1/2007 | Uchiyama et al. | |
| 2007/0035837 A1 | 2/2007 | Saito | |
| 2007/0053274 A1 | 3/2007 | Yoo et al. | |
| 2010/0020671 A9* | 1/2010 | Ooi et al. | 369/112.05 |

FOREIGN PATENT DOCUMENTS

EP   1 715 479 A1   10/2006
(Continued)

*Primary Examiner* — Wayne Young
*Assistant Examiner* — Dionne Pendleton
(74) *Attorney, Agent, or Firm* — Dickstein Shapiro LLP

(57) ABSTRACT

A disclosed optical pickup includes an aberration correction unit with a phase shifter surface. On the phase shifter surface, rectangular or staircase-like steps are formed in a concentric manner around an optical axial center, in certain regions where a light beam passes through. The steps have different heights in the optical axial direction. A light beam having a wavelength of 405 nm is directly transmitted through the steps so that a phase difference is applied for correcting spherical aberration that occurs on a first optical recording medium. A light beam that passes through an annular region without any steps is focused on a second optical recording medium. A light beam that passes through an outside region is focused by an object lens on the second optical recording medium, and is not focused on the first optical recording medium.

13 Claims, 34 Drawing Sheets

FOREIGN PATENT DOCUMENTS

| | | |
|---|---|---|
| JP | 06-036321 A | 2/1994 |
| JP | 7-302437 A | 11/1995 |
| JP | 10-143905 A | 5/1998 |
| JP | 11-096585 A | 4/1999 |
| JP | 2001-051192 A | 2/2001 |
| JP | 2004-279369 A | 10/2004 |
| JP | 3613745 B2 | 1/2005 |
| JP | 2005-317105 A | 11/2005 |
| JP | 2006-031824 A | 2/2006 |
| JP | 2006-092671 A | 4/2006 |
| JP | 2007-026540 A | 2/2007 |
| JP | 2007-048374 A | 2/2007 |
| JP | 2007-073173 A | 3/2007 |
| JP | 2008-090994 A | 4/2008 |
| WO | WO-2005-101393 A1 | 10/2005 |
| WO | WO-2006/043516 A1 | 4/2006 |
| WO | WO 2006-115262 A1 | 11/2006 |

\* cited by examiner

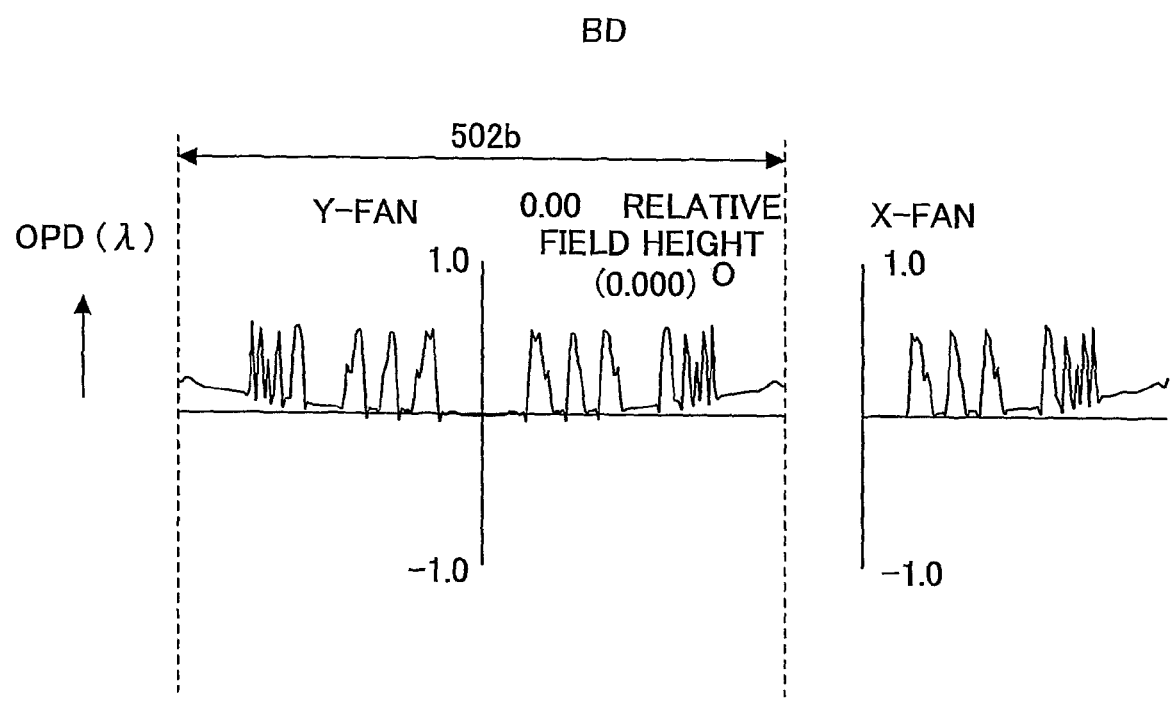

BD

HD

BD

HD

Δ = 0 μm

Δ = 20 μm

610 COMA

Δ = 50 μm

COMA 610

FINITE SYSTEM OBJECT DISTANCE 70mm

FINITE SYSTEM OBJECT DISTANCE 50mm

OPTICAL PICKUP AND OPTICAL INFORMATION PROCESSING DEVICE

TECHNICAL FIELD

The present invention relates to an optical focusing system for focusing light beams of the same wavelength emitted from a common light source, onto optical information recording media (hereinafter, "optical recording media") having different thicknesses in their substrates (substrate thickness), and an optical pickup and an optical information processing device including this optical focusing system.

BACKGROUND ART

Optical recording media, such as a CD with a storage capacity of 0.65 GB and a DVD with a storage capacity of 4.7 GB are becoming pervasive as means for saving video information, audio information, or computer data. Furthermore, in recent years and continuing, there are increasing demands for higher recording density and larger storage capacity.

In order to increase the recording density of such an optical recording medium, it is effective to reduce the diameter of a beam spot formed with an optical pickup configured to write/read information in/from the optical recording medium. The beam spot is formed on the optical recording medium by condensing a light beam with an object lens. The diameter of the beam spot can be reduced by increasing the numerical aperture (hereinafter, also abbreviated as "NA") of the object lens, or by shortening the wavelength of the light beam emitted from a light source.

For example, the NA of the object lens is 0.50 and the light source emits 780 nm wavelength light for a "CD-system optical recording medium", while the NA of the object lens is 0.65 and the light source emits 660 nm wavelength light for a "DVD-system optical recording medium" with which a higher recording density is achievable than the "CD-system optical recording medium". As described above, there are increasing demands for higher recording density and larger storage capacity in optical recording media. Thus, it is desirable to make the NA of the object lens greater than 0.65 and to make the wavelength of light emitted from the light source shorter than 660 nm.

Two standards have been proposed for such large-capacity optical recording media and optical information processing devices. One is the standard of "Blu-ray Disc" (hereinafter, "BD"), which uses a light source of a blue wavelength region and an object lens with an NA of 0.85 for securing a storage capacity of 22 GB. Another is the standard of "HD-DVD" (hereinafter, "HD"), which also uses a light source of a blue wavelength region, but uses an object lens with an NA of 0.65 for securing a storage capacity of 20 GB.

In the BD standard, the storage capacity is increased by making the wavelength shorter and making the NA larger than those of the HD standard. In the HD standard, the storage capacity is increased not by enlarging the NA but by improving the track recording density by making adjustments in signal processing, and by performing a land/groove recording method.

BD and HD both use a violet semiconductor laser light source with an oscillation wavelength of approximately 405 nm. However, BD and HD employ optical recording media having different substrate thicknesses, i.e., 0.1 mm and 0.6 mm, respectively.

In an optical pickup for recording and/or reproducing high density information based on BD and HD, the optical system is preferably applicable for both BD and HD in case the standards of BD and HD become equally pervasive.

Accordingly, such an optical pickup desirably has the following configuration. Specifically, a light source of an appropriate wavelength is selected according to the type of the optical recording medium to be used for recording or reproducing. An appropriate optical process is performed on a light beam emitted from the selected light source, in order to correct the difference in spherical aberration caused by the difference in the substrate thicknesses of the optical recording media.

In order to record or reproduce information of two different types of optical recording media with the use of a single optical pickup, there have been proposed means for using a single object lens and a phase difference adjusting surface (see patent document 1).

Furthermore, the inventors of the present invention have proposed, in Japanese Patent Application No. 2007-006975, means including an object lens and a diffraction surface to form a twin spot.

Patent Document 1: Japanese Patent No. 3613745

However, the invention described in patent document 1 is for correcting the aberration, which is caused by the difference in the substrate thicknesses, by applying a phase difference only for a region corresponding to a single ring-like range. This is because it is designed to be compatible for both DVD and CD having lower recording densities than those of the BD and HD standards. As described in patent document 1, when an object lens for DVDs and a phase difference adjusting element are provided before a transparent substrate of a CD, the shape of the wavefront aberration appears to be as illustrated in FIG. 30. That is, the aberration is large only around the radius position corresponding to the numerical aperture of the CD, compared to the phase of the wavefront near the optical axis. Accordingly, it is only necessary to provide a region forming a phase difference around the numerical aperture of the CD.

However, when an object lens with a high NA of approximately 0.85 is used in combination with short wavelength light to correct the aberration caused by the difference in thickness of the substrates, the wavefront aberration is extremely large as shown in FIG. 31. Therefore, although the method of applying a phase difference only for a single ring-like range is effective for correcting the aberration in the case of the DVD-system and the CD-system, the same method is insufficient for correcting the aberration in the case as illustrated in FIG. 31.

Furthermore, in the invention described in Japanese Patent Application No. 2007-006975, a twin spot is formed with the use of zero-order diffracted light and first-order diffracted light. Therefore, the diffraction efficiency of each light is approximately 40% at maximum, which leads to a decrease in the light utilization efficiency.

DISCLOSURE OF THE INVENTION

The present invention may provide an optical pickup and an optical information processing device in which one or more of the above-described disadvantages are eliminated.

A preferred embodiment of the present invention provides an optical pickup and an optical information processing device in which light beams of the same wavelength emitted from a common light source and a single object lens are used for reproducing and recording information with high precision for optical recording media with different substrate thicknesses, and only a phase shifter surface is used for switching the aperture and for correcting the aberration, thereby reducing cost, size, and weight.

An embodiment of the present invention provides an optical pickup for performing at least one of recording, reproducing, and erasing of information for at least two types of optical information recording media, the optical pickup including an optical focusing system configured to focus a light beam from a light source onto a first recording layer of a first optical information recording medium via a first substrate having a first thickness t1 with the use of a first numerical aperture NA1, and onto a second recording layer of a second optical information recording medium via a second substrate having a second thickness t2 that is different from the first thickness t1 with the use of a second numerical aperture NA2, wherein the optical focusing system includes an object lens designed to focus the light beam onto the first recording layer of the first optical information recording medium, and an aberration correction unit including at least one phase shifter surface that is divided into plural regions in a concentric manner according to steps having uneven shapes with different heights in a light axial direction, which phase shifter surface is configured to apply a phase difference to the light beam from the light source; the plural regions comprise a center region including an optical axis, an outside annular region extending from a position of the first numerical aperture NA1 to a position of the second numerical aperture NA2, and a middle annular region positioned between the center region including the optical axis and the outside annular region; phase differences of the center region, the outside annular region, and the middle annular region are integral multiples of $2\pi$ with respect to a wavelength of the light beam; the steps having the uneven shapes are formed in a first annular region between the center region and the middle annular region and in a second annular region between the middle annular region and the outside annular region; and the steps are formed in such a manner as to reduce aberration that is caused by a difference between the first thickness t1 of the first substrate and the second thickness t2 of the second substrate.

According to one embodiment of the present invention, an optical pickup exhibiting favorable spot performance is provided, in which the aperture can be switched and aberration can be corrected with the use of only a phase shifter surface having good light utilization efficiency, thereby reducing the number of components so that the size and cost are reduced. Additionally, an optical information processing device is provided, which corrects aberration for two different types of optical recording media (optical information recording media) while mitigating efficiency degradation and maintaining high precision.

BRIEF DESCRIPTION OF THE DRAWINGS

FIG. 5A illustrates a wavefront shape of a spot on a recording surface of a first optical recording medium (BD)

FIG. 8A illustrates a step-like shape for applying a phase difference, FIG. 8B illustrates a spot shape on the first optical recording medium (BD), and FIG. 8C illustrates a spot shape on the second optical recording medium (HD);

FIG. 9A illustrates a wavefront shape of the second optical recording medium (HD) and FIG. 9B illustrates a wavefront shape of the first optical recording medium (BD);

FIG. 11A illustrates a step-like shape for applying a phase difference, FIG. 11B illustrates a spot shape on the first optical recording medium (BD), and FIG. 11C illustrates a spot shape on the second optical recording medium (HD);

FIG. 12A illustrates aberration correction with a phase difference of $1\pi$, and FIG. 12B illustrates aberration correction with a phase difference of $1.2\pi$;

FIG. 28A illustrates a case where a light beam of a finite system has an object distance of 70 nm and FIG. 28B illustrates a case where a diverging ray of a finite system has an object distance of 50 nm;

BEST MODE FOR CARRYING OUT THE INVENTION

A description is given, with reference to the accompanying drawings, of an embodiment of the present invention.

<First Embodiment>

Figure 1:
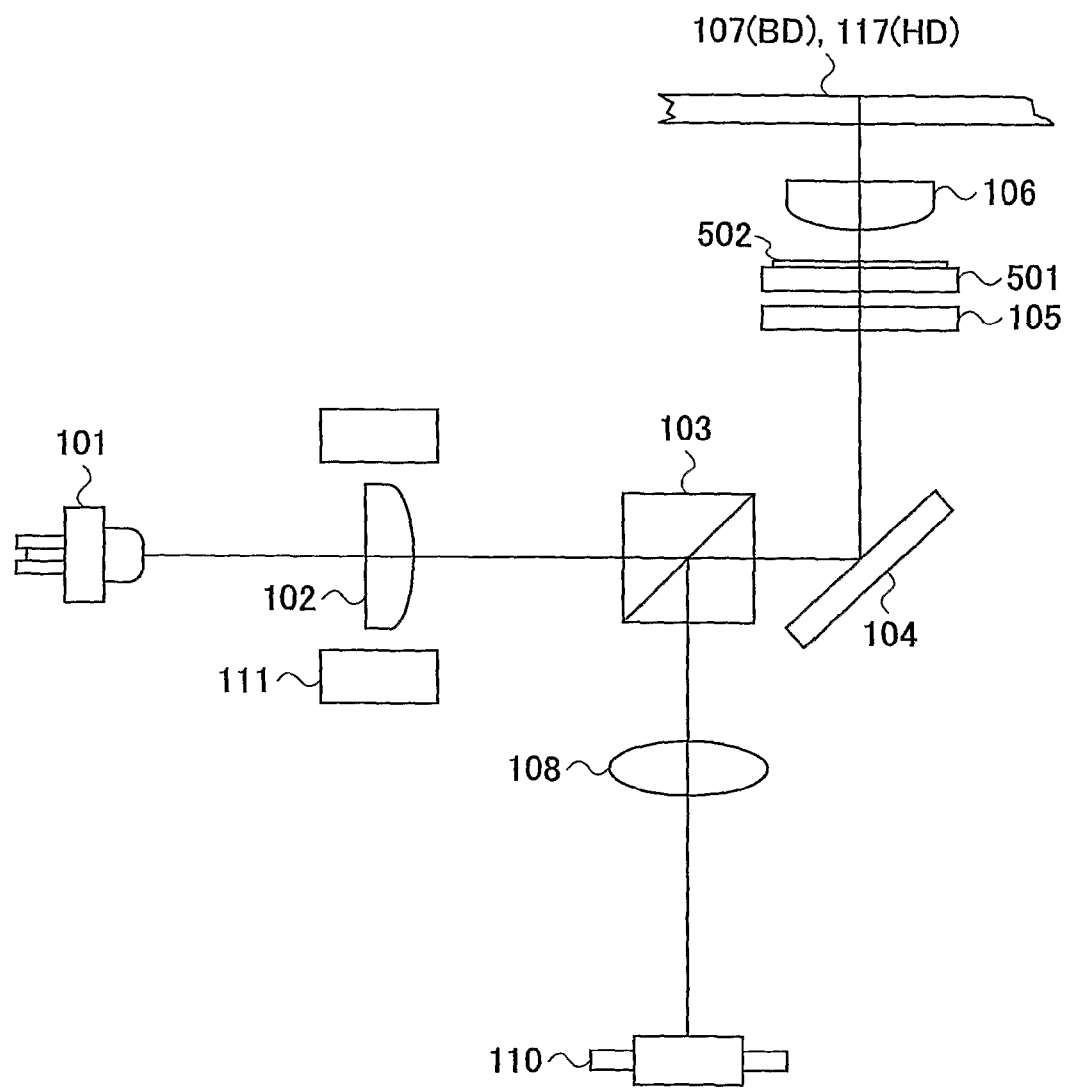
FIG. 1 is a schematic diagram of the overall configuration of an optical pickup according to a first embodiment of the present invention.

FIG. 1 is a schematic diagram of the overall configuration of an optical pickup according to a first embodiment of the present invention. This is a compatible-type optical pickup, in which a single object lens and light beams of the same wavelength emitted from a common light source are used to record or reproduce information for two different types of optical recording media, by using different numerical apertures.

A first optical recording medium 107 and a second optical recording medium 117 used in the optical pickup shown in FIG. 1 have substrate thicknesses t1, t2 of 0.1 mm and 0.6 mm, and correspond to BD and HD, respectively. First and second numerical apertures NA1 and NA2 are NA 0.85 and NA 0.65, respectively, and the light source operating wavelength is 405 nm.

For the first optical recording medium 107 and the second optical recording medium 117, the optical pickup is provided with a semiconductor laser 101, a collimation lens 102, a prism 104, a ¼ wave plate 105, an object lens 106, a polarization beam splitter 103, a detection lens 108, an aberration correction unit 501, and a light receiving element 110.

The semiconductor laser 101 which is a light source has a center wavelength of 405 nm. The numerical aperture NA1 of the object lens 106 is 0.85 for the first optical recording medium 107. The numerical aperture NA2 of the object lens 106 is 0.65 for the second optical recording medium 117. The aberration correction unit 501 controls the operation of switching the numerical aperture.

The light irradiated from the semiconductor laser 101 is turned into substantially collimated light by the collimation lens 102. The light that has passed through the collimation lens 102 is incident on the polarization beam splitter 103 and is deflected by the prism 104. The light is condensed by the ¼ wave plate 105, the aberration correction unit 501, and the object lens 106, to thereby record or reproduce the information. The reflection light from the first optical recording medium 107 passes through the object lens 106 and the ¼ wave plate 105, and is deflected by the polarization beam splitter 103 to be separated from the incident light. The deflected light is guided onto the light receiving element 110 by the detection lens 108, so that reproduction signals, focus error signals, and track error signals are detected.

The object lens 106 is optimally designed so that information can be recorded and reproduced with high precision for the first optical recording medium 107. The object lens 106 has a design wavelength of 405 nm, and is designed so that the wavefront aberration is sufficiently low, at less than or equal to 0.01 λrms, at a wavelength of 405 nm.

The object lens 106 according to the first embodiment of the present invention is optimally designed for the first optical recording medium 107 having a thickness of 0.0875 mm. It is assumed that the optical recording medium is a two-layer Blu-ray Disc having two layers of information recording surfaces. The information recording surfaces are positioned at 0.075 mm and 0.1 mm from the side where the light enters. Therefore, the thickness of 0.0875 mm, which is the intermediate value of these values, is used as the design median. However, the thickness is not limited thereto. For example, the thickness can be set at 0.1 mm or 0.075 mm.

Furthermore, spherical aberration occurs when a light beam is focused onto an information recording surface having a substrate thickness different from the design median. In this case, the spherical aberration is corrected by moving the collimation lens 102 in an optical axial direction with a movable unit (coil) 111 to turn the light beam into a diverging ray or a converging ray.

The object lens 106 according to the first embodiment of the present invention is aspherical on both sides. Assuming that the vertex of the surface is the origin, and that r is a paraxial curvature radius, κ is a constant of the cone, and A, B, C, D, E, F, G, H, J, ... are aspherical constants in an orthogonal coordinate system having the optical axial direction extending from the light source to the optical recording medium as the +X axis, the shape of the aspherical surface can be expressed by formula 1 based on the relationship of the length x of the surface in the optical axial direction and the radius R.

$$x = \frac{\frac{1}{r}R^2}{1+\sqrt{1-(1+\kappa)\frac{1}{r^2}R^2}} + AR^4 + BR^6 + CR^8 +$$
$$DR^{10} + ER^{12} + FR^{14} + GR^{16} + HR^{18} + JR^{20} + \ldots$$
$$R = \sqrt{y^2 + z^2}$$

(Formula 1)

The surface data of each surface and each region are indicated in table 1.

TABLE 1

| SIDE NO. | TYPE 1 | CURVATURE RADIUS [mm] | SIDE INTERVAL [mm] | GLASS MATERIAL |
|---|---|---|---|---|
| FIRST SIDE | ASPHERICAL | 1.751249 | 2.91 | KVC79 |
| SECOND SIDE | ASPHERICAL | −5.3510 | | |

| ASPHERICAL CONSTANT | FIRST SIDE | SECOND SIDE |
|---|---|---|
| K | −0.642375 | −182.2349 |
| A | .00507392 | 0.357354E−01 |
| B | 0.00049067 | −0.158E−01 |
| C | 5.3223E−005 | −.530534E−03 |
| D | 3.6300E−005 | 0.172532E−02 |
| E | −1.4962E−005 | −.357215E−03 |
| F | 2.2702E−006 | 1.060531E−005 |
| G | 7.168E−007 | 0 |
| H | −2.0516E−007 | 0 |

The material of the glass forming the object lens 106 is KVC79 manufactured by Sumita Optical Glass, Inc. The effective pupil radius of the object lens 106 is 2.14 mm. The material of the object lens 106 is not limited to glass; the object lens 106 can be made of resin.

Figure 2A:
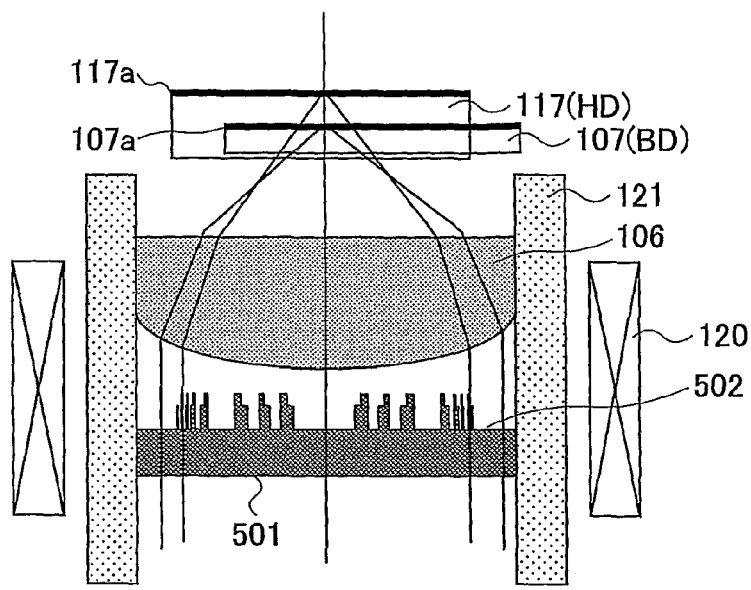
FIGS. 2A, 2B, and 2C are enlarged cross-sectional views of aberration correction units.
Figure 2B:
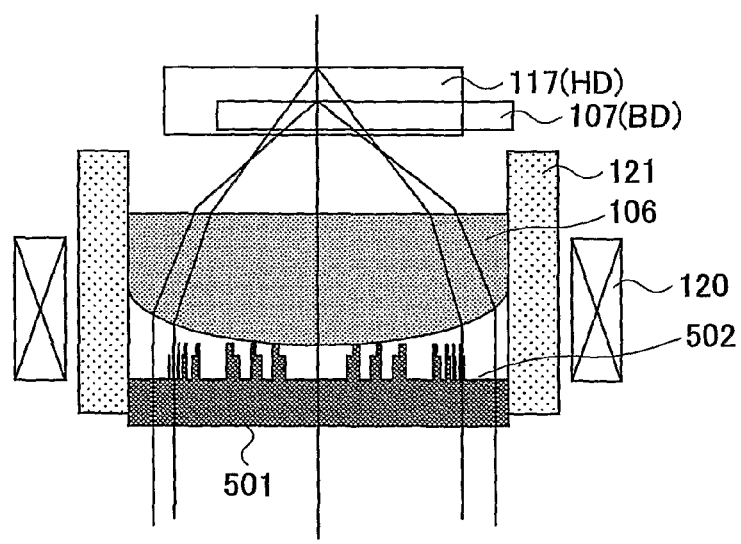
Figure 2C:
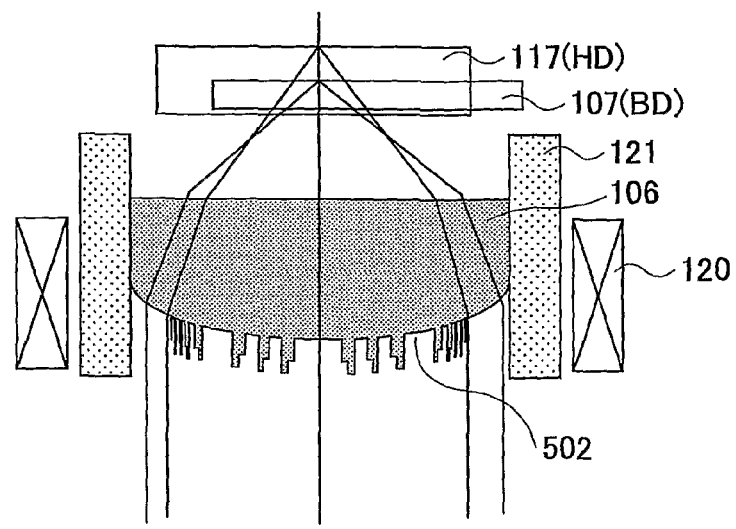
Figure 3:
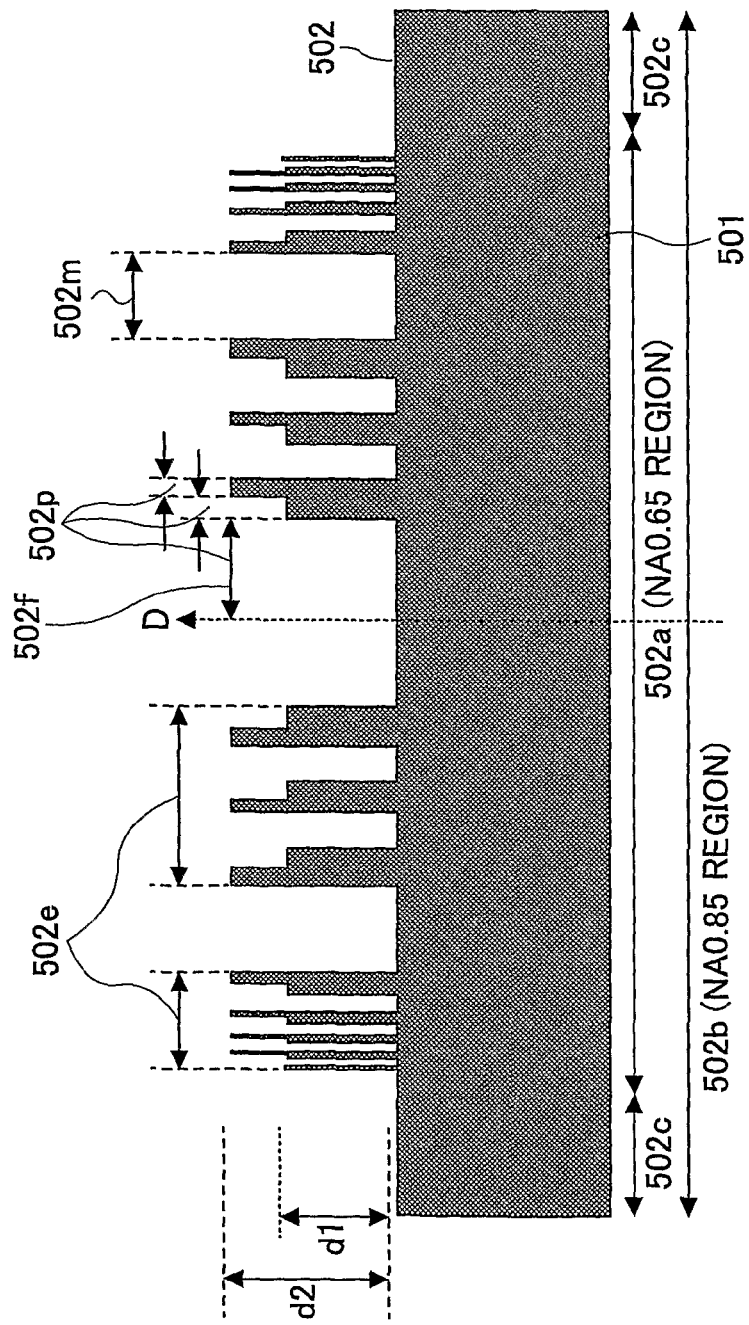
FIG. 3 is a cross-sectional view of the aberration correction unit for describing a phase shifter surface.

FIGS. 2A through 4B are diagrams for describing the aberration correction unit 501. FIGS. 2A through 3 are enlarged cross-sectional views. The aberration correction unit 501 is a compatible-type element for correcting the spherical aberration that is caused by the difference in the substrate thicknesses. Specifically, the aberration correction unit 501 corrects the spherical aberration which occurs at the object lens 106 as light is irradiated from the semiconductor laser 101 having an operating wavelength of 405 nm toward the second optical recording medium 117. Furthermore, the aberration correction unit 501 also has a function of limiting the aperture when switching the aperture of the object lens 106 for the first optical recording medium 107 and the second optical recording medium 117.

FIG. 2A is a schematic cross-sectional view of the aberration correction unit 501 and the object lens 106 according to the first embodiment of the present invention. As shown in FIG. 2A, the aberration correction unit 501 and the object lens 106 are combined at a common axis by a lens tube 121. Specifically, the aberration correction unit 501 is fixed at one end of the lens tube 121 and the object lens 106 is fixed at the other end of the lens tube 121. These elements are combined in such a manner as to have a common axis along the light axis. Incidentally, 107a and 117a denote recording surfaces of the first optical recording medium 107 (BD) and the second optical recording medium 117 (HD), respectively. Furthermore, 120 denotes a moveable unit (coil), which is integrally combined with the lens tube 121. The moveable unit 120 includes a magnet and a magnetic circuit (not shown), and is configured to move the lens tube 121.

Generally, tracking control is performed when recording and/or reproducing information for the first optical recording medium 107 and the second optical recording medium 117. Accordingly, the object lens 106 moves within a range of ±0.5 mm in the vertical direction with respect to the light axis. However, the aberration correction unit 501 applies a phase difference for the second optical recording medium 117. For this reason, if the aberration correction unit 501 does not move and only the object lens 106 moves, an aberration difference is caused, which degrades the focal spot. Thus, the aberration correction unit 501 and the object lens 106 are combined so that they move together when tracking control is performed. Accordingly, a favorable focal spot can be formed.

At least one of the aberration correction unit 501 and the object lens 106 can be provided with a flange, and the aberration correction unit 501 and the object lens 106 can be directly combined via the flange. Moreover, the object lens 106 and the lens tube 121 can be formed as an integrated unit. Furthermore, the object lens 106, the lens tube 121, and the aberration correction unit 501 can all be formed as an integrated unit.

The present invention is not limited to the above configuration. As shown in FIG. 2B, it can be directly disposed under an actuator. As shown in FIG. 2C, the aberration correction unit and the object lens can be formed as a single unit.

In the first embodiment according to the present invention, light beams from the light source enter the aberration correction unit 501 as collimated light. That is, the light beams are not diverging rays or converging rays. This provides an advantage in that coma-aberration does not occur even if the combined object lens 106 and the aberration correction unit 501 deflect due to the tracking control at the time of recording or reproducing for an optical recording medium.

FIG. 3 is a cross-sectional view of the aberration correction unit 501 according to the first embodiment of the present invention. The aberration correction unit 501 includes a phase shifter surface 502. The phase shifter surface 502 has steps formed on a substrate (parallel plate), which steps have uneven shapes as viewed cross-sectionally. The phase shifter surface 502 can be disposed on the side of the object lens 106, or on the side of the light source. On the other side of the substrate, on the opposite side of that provided with the phase shifter surface 502, a ¼ wave plate can be formed. The uneven shapes refer to, for example, rectangular shapes, staircase-like shapes, trapezoidal shapes, or curved shapes.

The aberration correction unit 501 is made of BK7, which is optical glass. Glass is a highly reliable optical material as it has excellent heat resistance and light resistance, and is impervious to changes in the environment such as temperature fluctuation. Resin can also be used as the material for forming the aberration correction unit 501. Resin is lighter than glass, and facilitates mass production as the fabrication process is simple. For example, PMMA (polymethylmethacrylate) can be used as the resin. PMMA is highly transparent and weather-resistant, and is particularly appropriate for injection molding. Therefore, PMMA is one of the most prevalent resin materials used for optical components. ZEONEX, which is an optical resin manufactured by ZEON Corporation, can also be used, although the moisture absorption is low. Furthermore, the aberration correction unit 501 can be made of any optical resin including ultraviolet curable resin, and optical glass.

As shown in FIG. 3, in the phase shifter surface 502, an NA 0.85 region 502b is divided into plural regions by rectangular or staircase-like steps. These steps are formed in a concentric manner centering on an optical axis, and have different heights in the optical axial direction.

Among the divided regions, a center region 502f including the optical axis, a middle region 502m, and an outside region 502c have phase differences that are integral multiples of $2\pi$ with respect to a wavelength of 405 nm.

Uneven steps are formed in annular regions 502e between the center region 502f and the middle region 502m and between the middle region 502m and the outside region 502c. The steps formed in the region 502e allow light beams having a wavelength of 405 nm to be directly transmitted, and apply a phase difference for correcting the aberration that is caused by a difference in the thickness of the substrate of the second optical recording medium 117.

Light beams of one of the annular regions 502e, which has steps for applying a phase difference corresponding to an integral multiple of 2π with respect to a wavelength of 405 nm compared to the center region 502f, the center region 502f, the middle region 502m, and the outside region 502c are primarily focused onto a substrate of the first optical recording medium 107.

Light beams of the center region 502f, the middle region 502m, and the region 502e including the uneven steps, which correspond to the entire region of an NA 0.65 region 502a, are primarily focused onto a substrate of the second optical recording medium 117.

For the second optical recording medium 117, the phase shifter surface 502 is configured to correct the aberration and switch the aperture. Accordingly, a favorable focal spot can be formed.

Figure 4A:
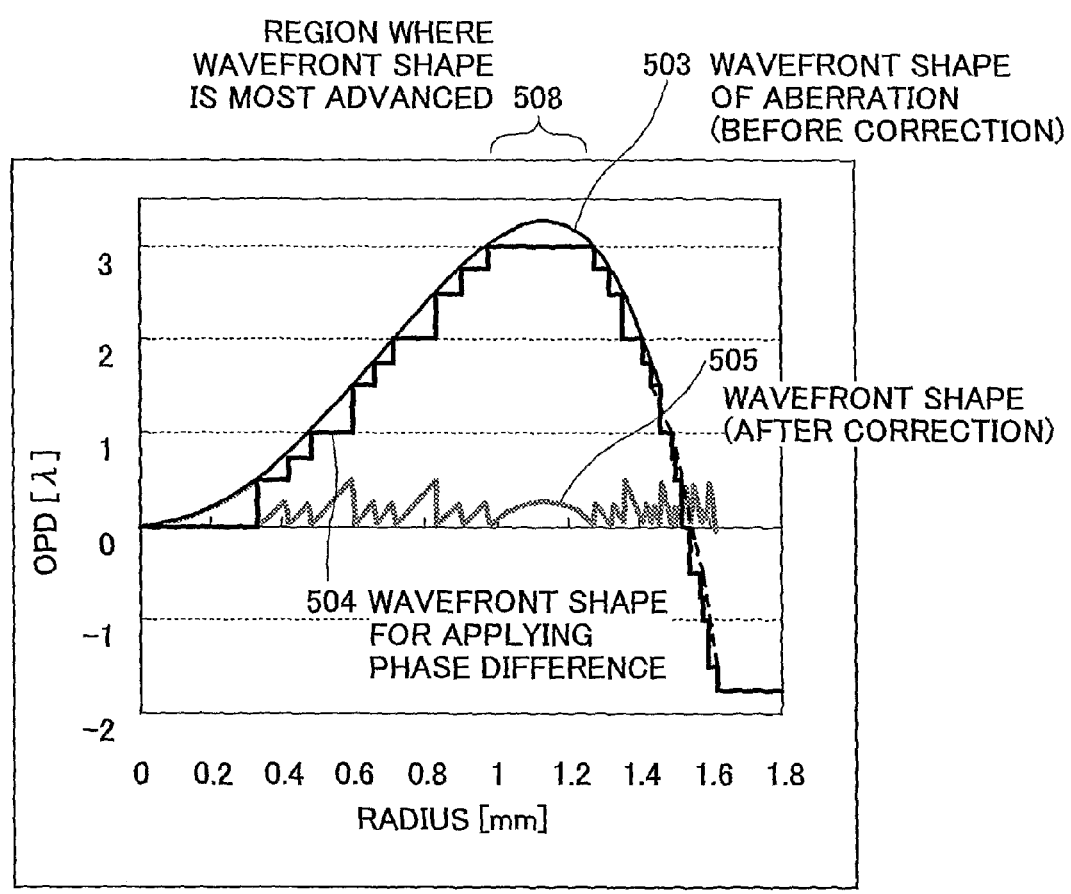
FIG. 4A illustrates a wavefront shape of aberration that is caused by the difference in the substrate thickness.
Figure 4B:
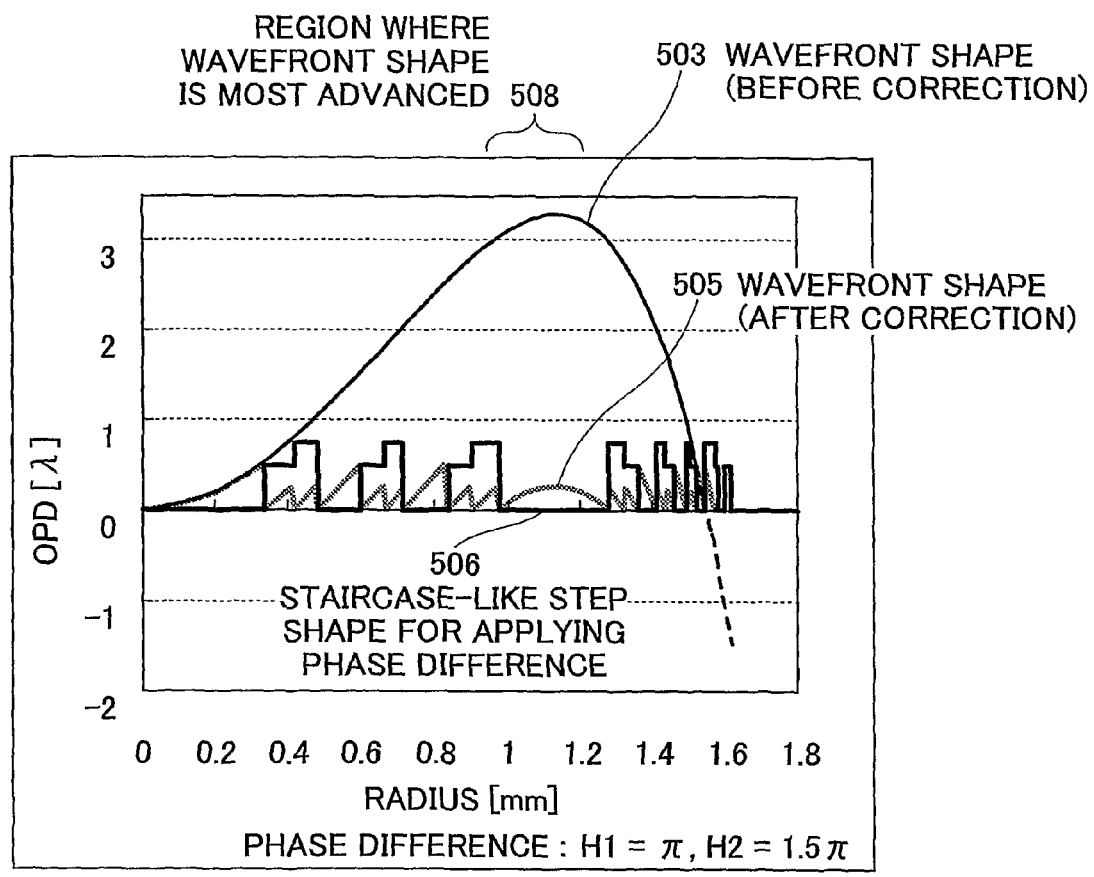
FIG. 4B illustrates a step-like shape for applying a phase difference.

Next, the principle of correcting the aberration for the second optical recording medium 117 is described with reference to FIGS. 4A and 4B. In FIGS. 4A and 4B, the horizontal axis represents the pupil radius position of the object lens, and the vertical axis represents the phase (λ). In FIG. 4A, 503 denotes the wavefront shape (before correction) of the aberration that is caused by the difference in the substrate thickness of the second optical recording medium (HD). In order to correct the wavefront of the wavefront shape 503, a phase difference having a staircase-like shape is applied, which is indicated by a wavefront shape 504. As indicated by a wavefront shape 505 after correction, the wavefront that is ahead of and behind the optical axial center (wavefront shape 503) is corrected to have substantially the same phase as the optical axial center.

Similarly, as shown in FIG. 4B, the wavefront shape 503 can be corrected to be a wavefront shape 505 by applying a phase difference having a staircase-like shape as indicated by a step shape 506. The phase difference of the step shape 506 is obtained by shifting that of the wavefront shape 504 of FIG. 4A by an integral multiple of 2π with respect to the wavelength. The shape 506 can apply the same phase difference as that of the wavefront shape 504.

In the first embodiment of the present invention, the steps are configured to apply phase differences of $(1+2 \times a)\pi$ and $(1.5+2 \times b)\pi$ with respect to the wavelength. Specifically, a=0, b=0, and the heights of the steps shown in FIG. 3 are set as $d1=\frac{1}{2} \times \lambda/(n-1)=0.38$ μm and $d2=\frac{3}{4} \times \lambda/(n-1)=0.57$ μm. In these formulae, λ is a wavelength of 405 nm, and n is a refractive index 1.530 in a wavelength 405 nm of BK7. Assuming that the phase differences applied by these steps are H1 and H2, H1=π and H2=1.5π, respectively, and $\pi \leq H1$ and $H2 < 2\pi$ are satisfied.

The heights of the steps are not limited thereto; they can be set as $d1=(\frac{2}{4}+1) \times \lambda/(n-1)$ and $d2=(\frac{3}{4}+1) \times \lambda/(n-1)$, where a=1 and b=1.

In an embodiment of the present invention, the phase difference 2π corresponds to step $d=\lambda/(n-1)$, and the phase difference 4π corresponds to step $d=2 \times \lambda/(n-1)$.

Figure 5B:
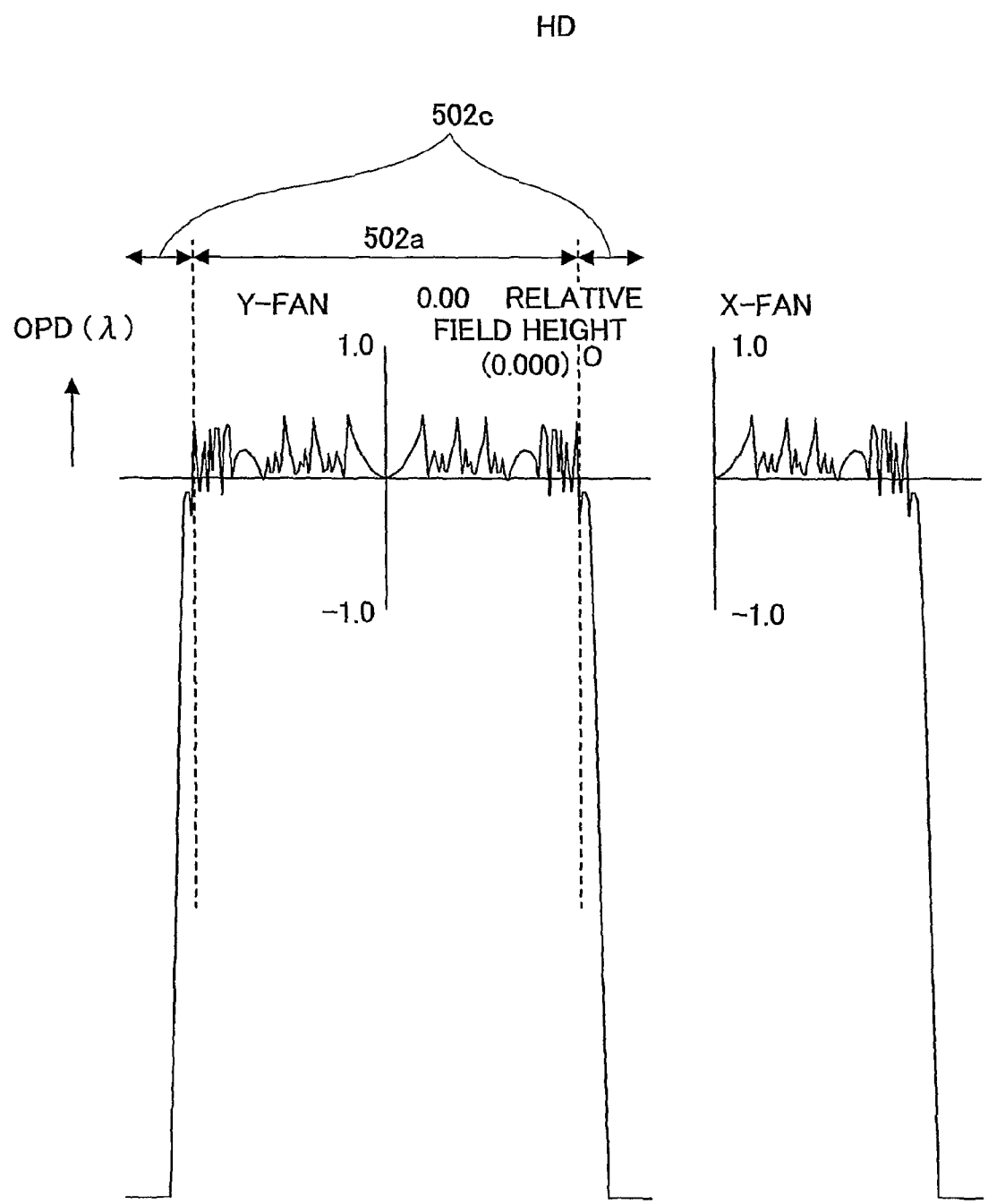
FIG. 5B illustrates a wavefront shape of a spot on a recording surface of a second optical recording medium (HD)

FIG. 5A illustrates a wavefront shape of a spot on a recording surface of the first optical recording medium (BD), and FIG. 5B illustrates a wavefront shape of a spot on a recording surface of the second optical recording medium (HD). The horizontal axis represents the pupil radius position of the object lens, and the vertical axis represents the phase (λ). In FIG. 5A, the spherical aberration is less than or equal to 0.01 λrms, and the wavefront that is intermittently shifting due to steps is a high order aberration. Furthermore, as shown in FIG. 5B, in the outside region 502c extending from the NA 0.65 region to the NA 0.85 region, the wavefront is delayed precipitously, thus functioning as an aperture limiting function of the NA 0.65 region 502a. A phase difference is applied to the NA 0.65 region 502a by steps, thus favorably correcting the spherical aberration to less than or equal to 0.01 λrms.

Figure 6A:
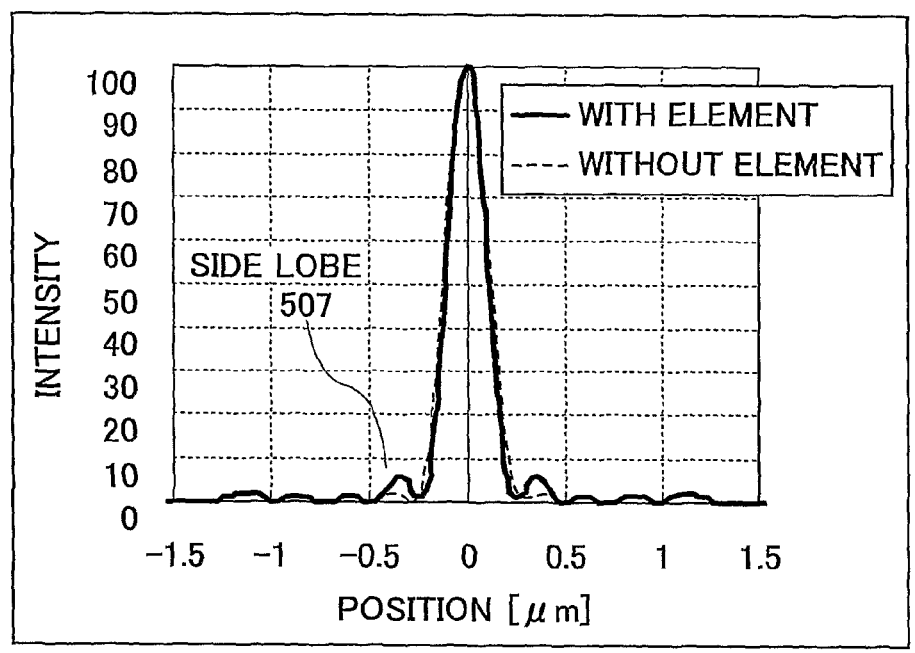
FIG. 6A illustrates the shape of a spot intensity distribution on the recording surface of the first optical recording medium (BD)
Figure 6B:
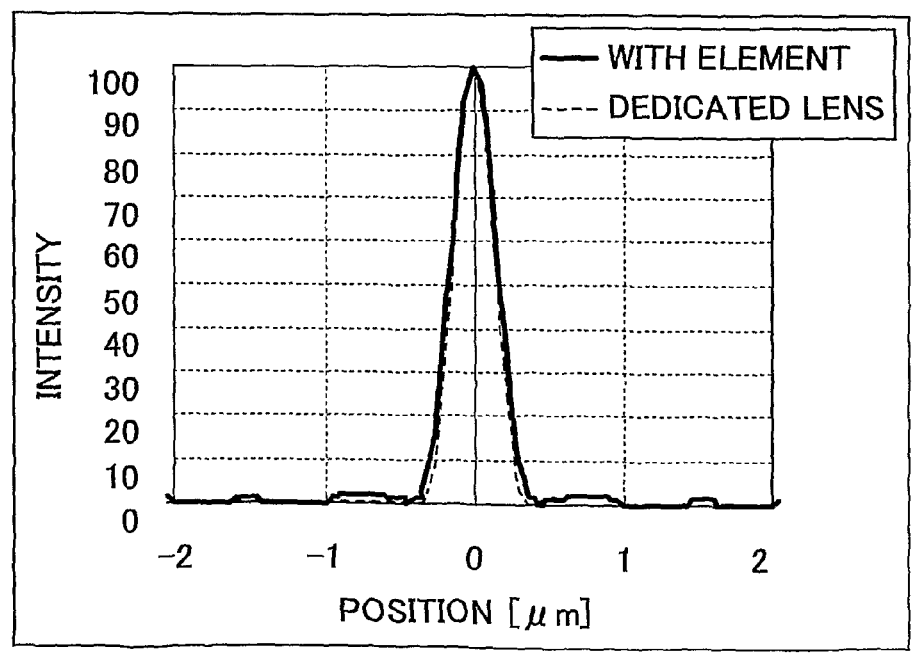
FIG. 6B illustrates the shape of a spot intensity distribution on the recording surface of the second optical recording medium (HD)

FIG. 6A illustrates the shape of a spot intensity distribution on the recording surface of the first optical recording medium (BD), and FIG. 6B illustrates the shape of a spot intensity distribution on the recording surface of the second optical recording medium (HD). For the purpose of comparison, FIG. 6A includes a dotted line indicating spot shapes in a case where there is no element provided as the aberration correction unit, and FIG. 6B includes a dotted line indicating spot shapes in a case where an object lens dedicated for HD is used.

As shown in FIG. 6A, the BD spot has a smaller spot diameter than that when the element is not provided, thereby forming a favorable spot. The reason is that in the annular regions where d1=0.38 μm and d2=0.57 μm, the phase shifts intermittently, and therefore the spot performance is not largely affected. By controlling the phase of the light beams, a super resolution effect can be attained, where microscopic spots exceed the diffraction limit. Accordingly, favorable spots can be formed.

As shown in FIG. 6B, the HD spot has the same spot diameter as that when using an object lens dedicated to HD. Aberration correction and aperture limitation are performed at the phase shifter surface, and therefore a favorable spot can be formed.

As shown in FIGS. 4A and 4B, the wavefront phase is most advanced in a region 508 in the shape of the spherical aberration caused by the difference between the thickness t1 and the thickness t2 of the substrates. The phase shifter surface according to the first embodiment of the present invention is formed so that this region 508 is an annular middle region (without steps), where the steps on the phase shifter surface are d=0, i.e., an integral multiple of 2π. That is, the region 508 where the wavefront phase is most advanced decreases the displacement with respect to the radius position of the wavefront shape, and the annular region where the step d=0, is set to be wide.

Furthermore, as shown in FIG. 3, it is assumed that the radius of each of the regions divided according to different steps has a length expressed as a pitch 502p. The region with the longest pitch 502p is the middle region 502m, excluding the center region. 502f and the outside region 502c. The middle region 502m includes the radius position where the wavefront phase is most advanced (the region 508 shown in FIG. 4B) in the wavefront shape of the spherical aberration caused by the difference between the thickness t1 of the BD substrate and the thickness t2 of the HD substrate. Furthermore, the staircase-like shapes of the phase steps in different annular regions 502e are inverted with respect to each other, with the middle region 502m acting as a boundary between the inverse shapes.

The radial position where the wavefront is most advanced is defined as the region 508. However, the position is not limited thereto. A radial position having a local minimum point where the tilt of the wavefront shape becomes zero or a local maximum point can be defined as the radial position where the wavefront is most advanced.

With such a configuration, the region with a large pitch can be set as the middle region 502m, and can be made to have a step (d=0) that primarily contributes to the BD spot. Accordingly, the size of side lobes 507 (see FIG. 6A) can be reduced. The side lobes 507 correspond to intensity distributions along the periphery of a center region of the spot intensity distribution. If the sizes of the side lobes 507 can be reduced, intersymbol interference can be reduced, thereby attaining favorable reproduction signals. Furthermore, the high order aberration of the BD spot can be reduced and the peak intensity of the spot can be increased, thereby improving efficiency for light utilization.

Figure 7:
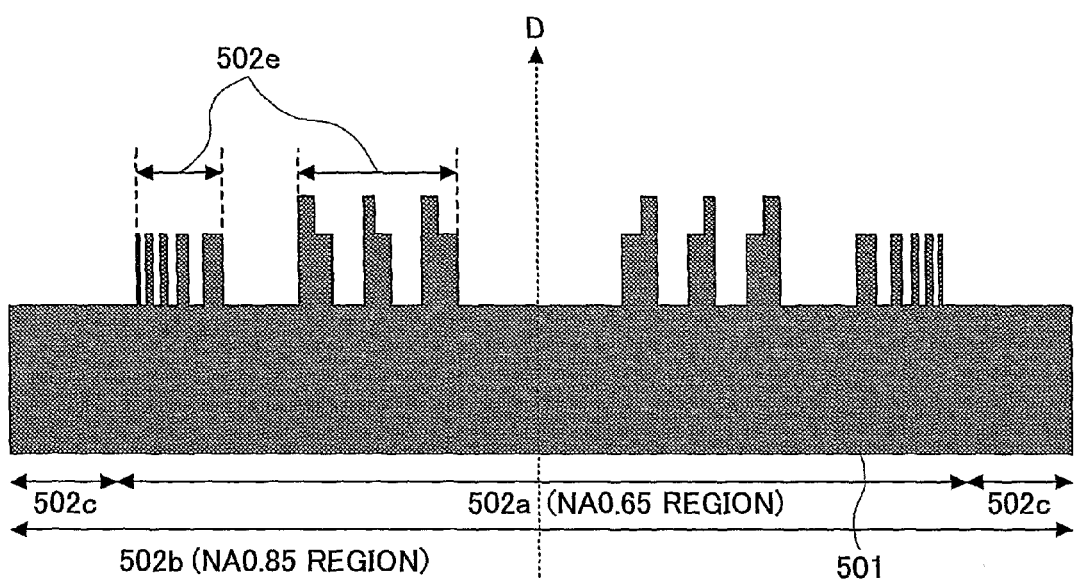
FIG. 7 is a cross-sectional view of an aberration correction unit with rectangular steps in the region with uneven steps of small pitch.

Furthermore, as shown in FIG. 7, in the region 502e with uneven steps having small pitch, the steps can have rectangular shapes instead of staircase-like shapes, which facilitates the manufacturing process. Furthermore, it is possible to mitigate light quantity loss caused by diffraction that occurs due to phase steps.

<Second Embodiment>

Figure 8A:
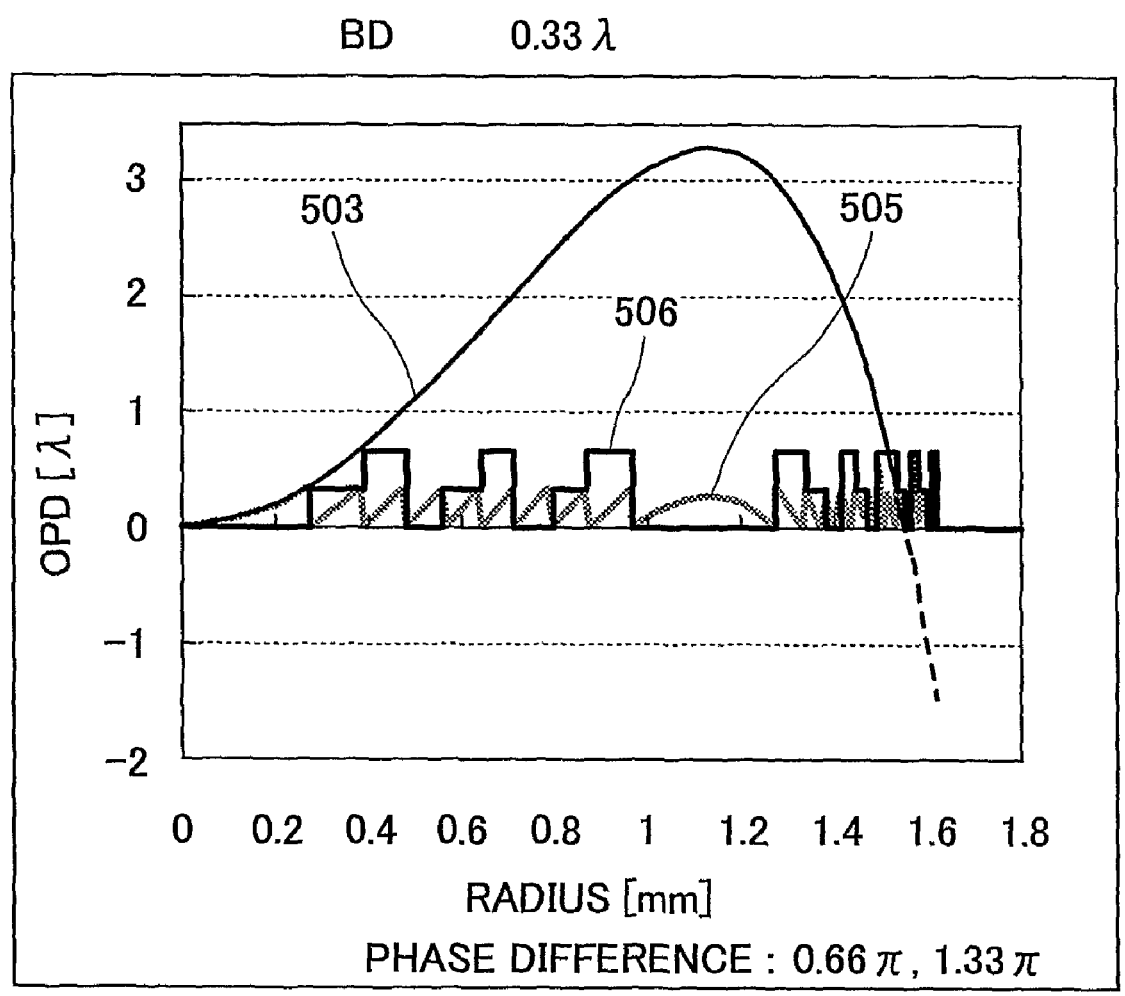
FIGS. 8A through 8C are diagrams for describing aberration correction according to a second embodiment of the present invention, where
Figure 8B:
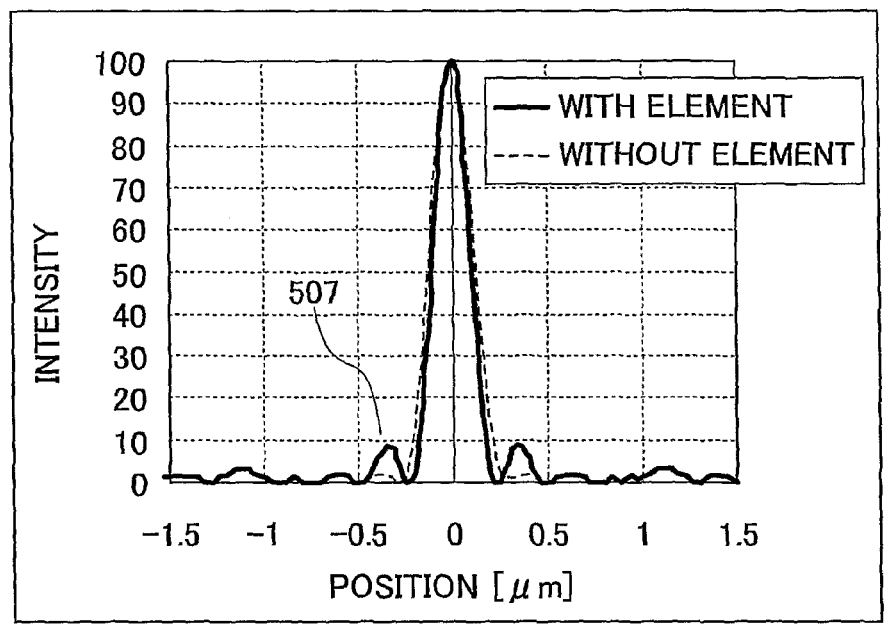
Figure 8C:
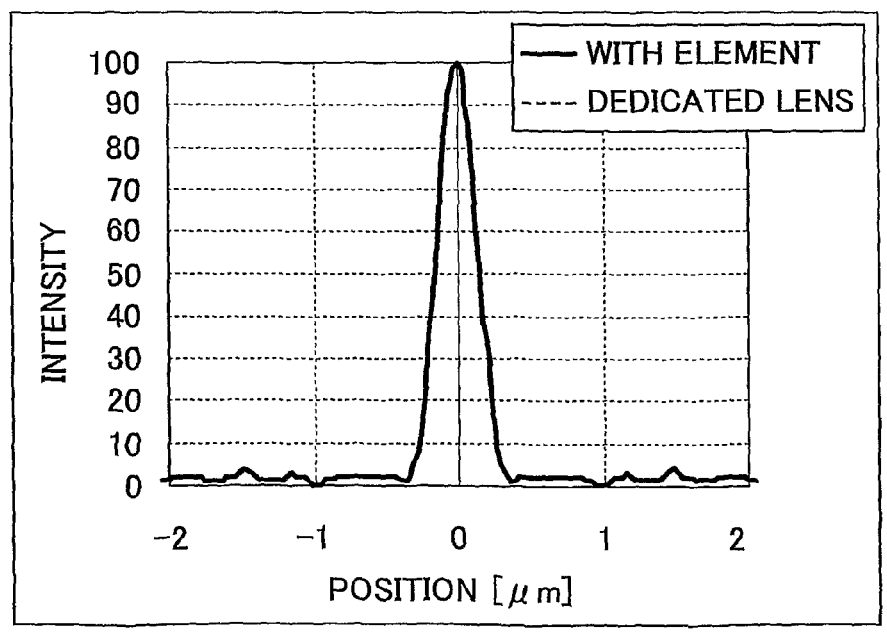

FIGS. 8A through 8C are diagrams for describing aberration correction according to a second embodiment of the present invention. Assuming that the shape 506 applies a phase difference of H1=0.66π and H2=1.33π with respect of the wavelength as shown in FIG. 8A, the BD spot is illustrated in FIG. 8B and the HD spot is illustrated in FIG. 8C.

These diagrams say that the spots are favorably focused on the corresponding substrates having the thicknesses t1 and t2. Particularly, the HD wavefront shape has a low PV value of less than or equal to 0.33 λ, and the high order aberration is small. Accordingly, the side lobes 507 are reduced and the spot peak intensity is high, thereby attaining the same performance as that attained with an HD dedicated lens.

The BD spot does not satisfy the conditions of π≦H1 or H2<2π, and therefore the high order aberration is slightly higher than that of the first embodiment according to the present invention. Furthermore, as shown in FIG. 8B, the side lobes 507 are slightly higher and the peak intensity of the BD spot is lower.

<Third Embodiment>

Figure 9A:
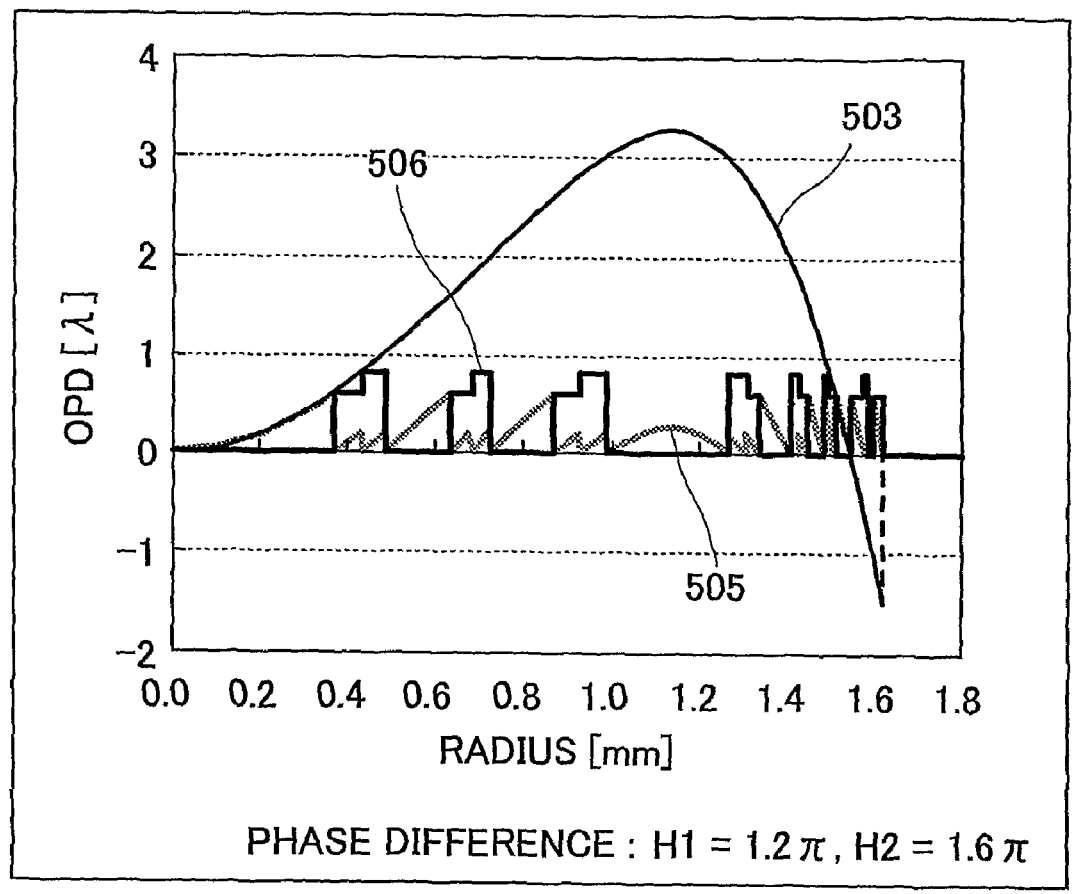
FIGS. 9A and 9B illustrate wavefront shapes transmitted through steps for applying a phase difference for aberration correction according to a third embodiment of the present invention, where
Figure 9B:
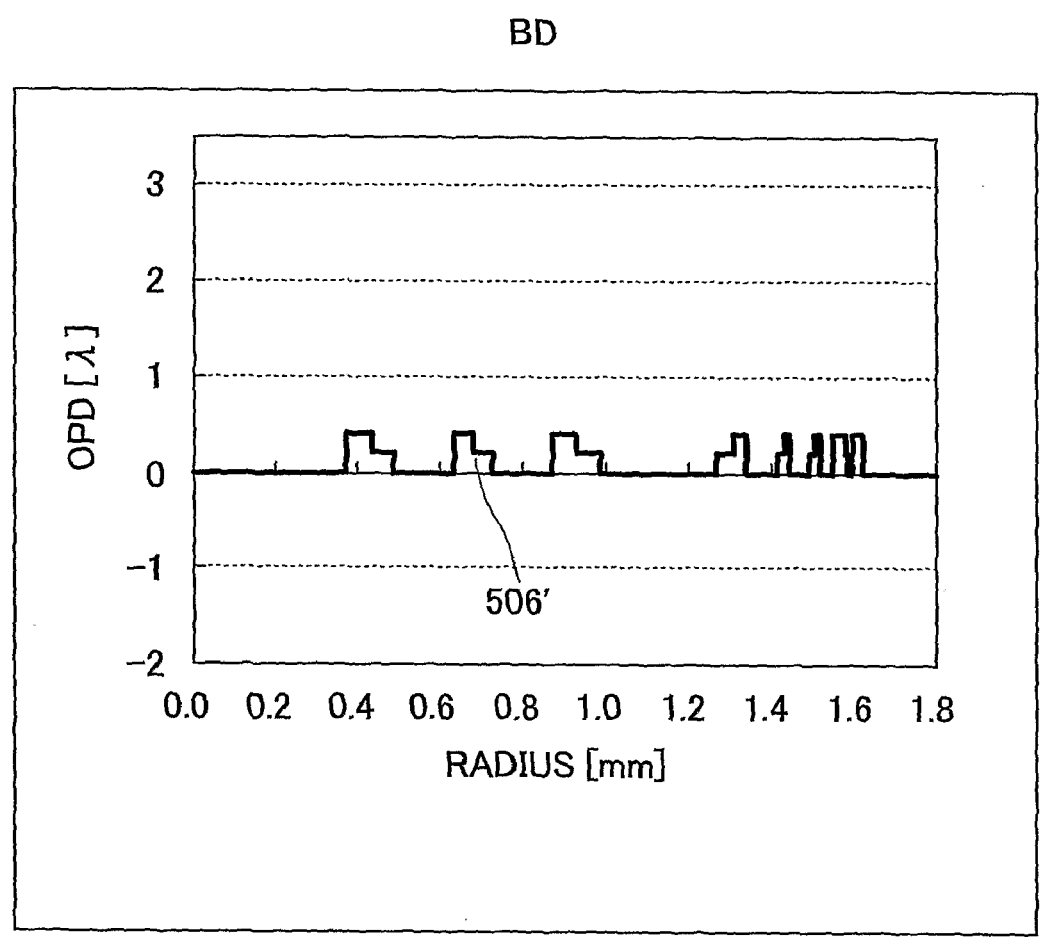
Figure 10A:
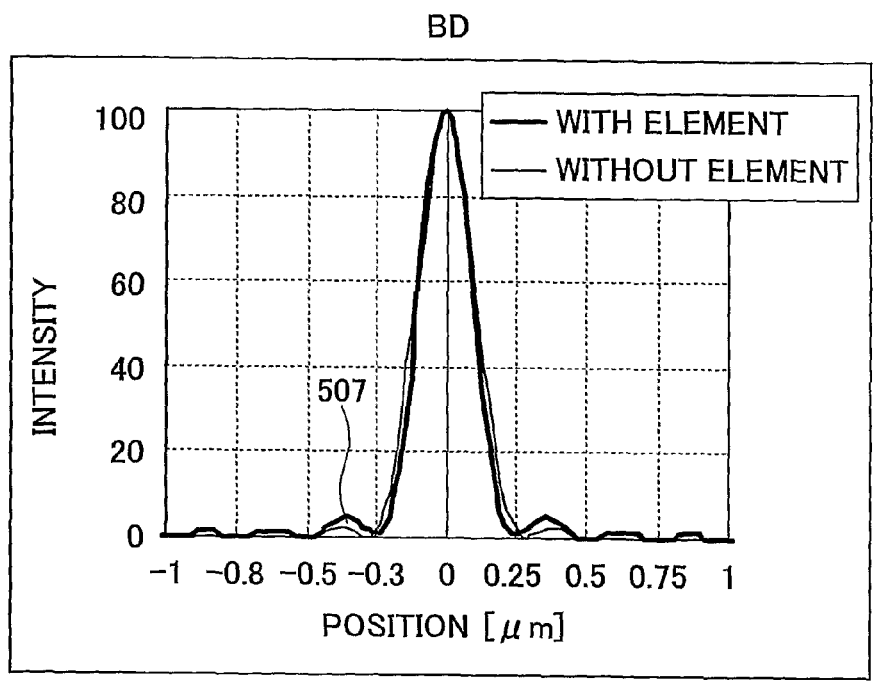
FIG. 10A illustrates the shape of a spot intensity distribution on the recording surface of the first optical recording medium (BD)
Figure 10B:
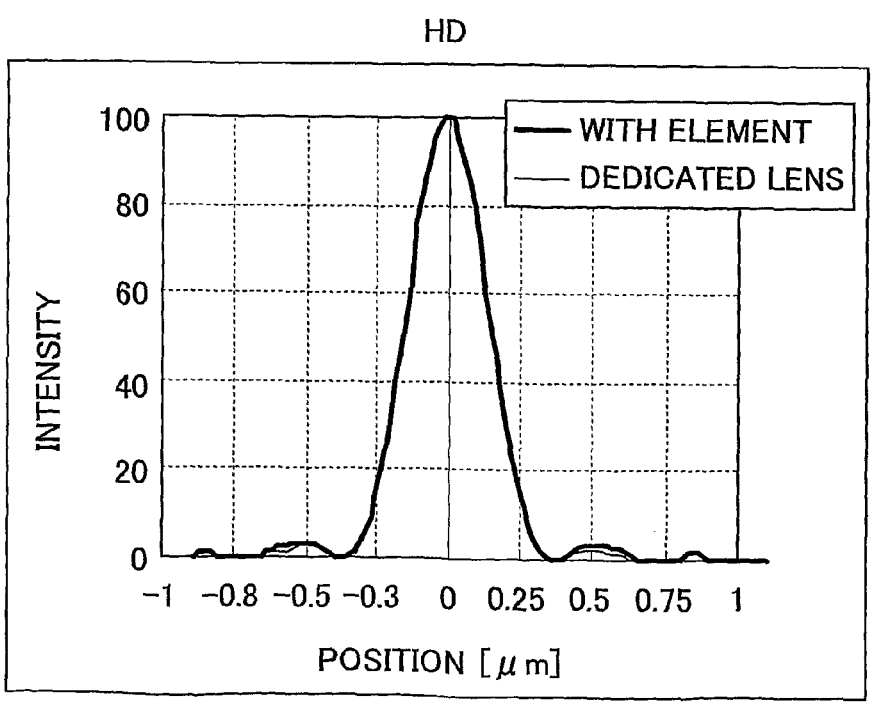
FIG. 10B illustrates the shape of a spot intensity distribution on the recording surface of the second optical recording medium (HD)

FIGS. 9A and 9B are diagrams for describing aberration correction according to a third embodiment of the present invention. Assuming that the step shape 506 applies a phase difference of H1=1.2π and H2=1.6π with respect of the wavelength, FIG. 9A illustrates the corrected wavefront shape 505 of HD, and FIG. 9B illustrates a wavefront shape 506' of BD that has been transmitted through the step shape 506. Furthermore, the BD spot is illustrated in FIG. 10A and the HD spot is illustrated in FIG. 10B. These diagrams say that the spots are favorably focused on the corresponding substrates having the thicknesses t1 and t2. Compared to the shapes of 1π and 1.5π of the first embodiment, the regions having phase steps are narrower in the third embodiment. Therefore, the phase differences of the wavefront generated in BD are smaller, at 0.8π and 0.4π. Accordingly, the high order aberration of the BD spot is lower and the region that can contribute to the spot is larger compared to the first embodiment. Therefore, the phase shifter surface according to the third embodiment can reduce the side lobes 507 of BD and increase the peak intensity of the BD spot.

<Fourth Embodiment>

Figure 11A:
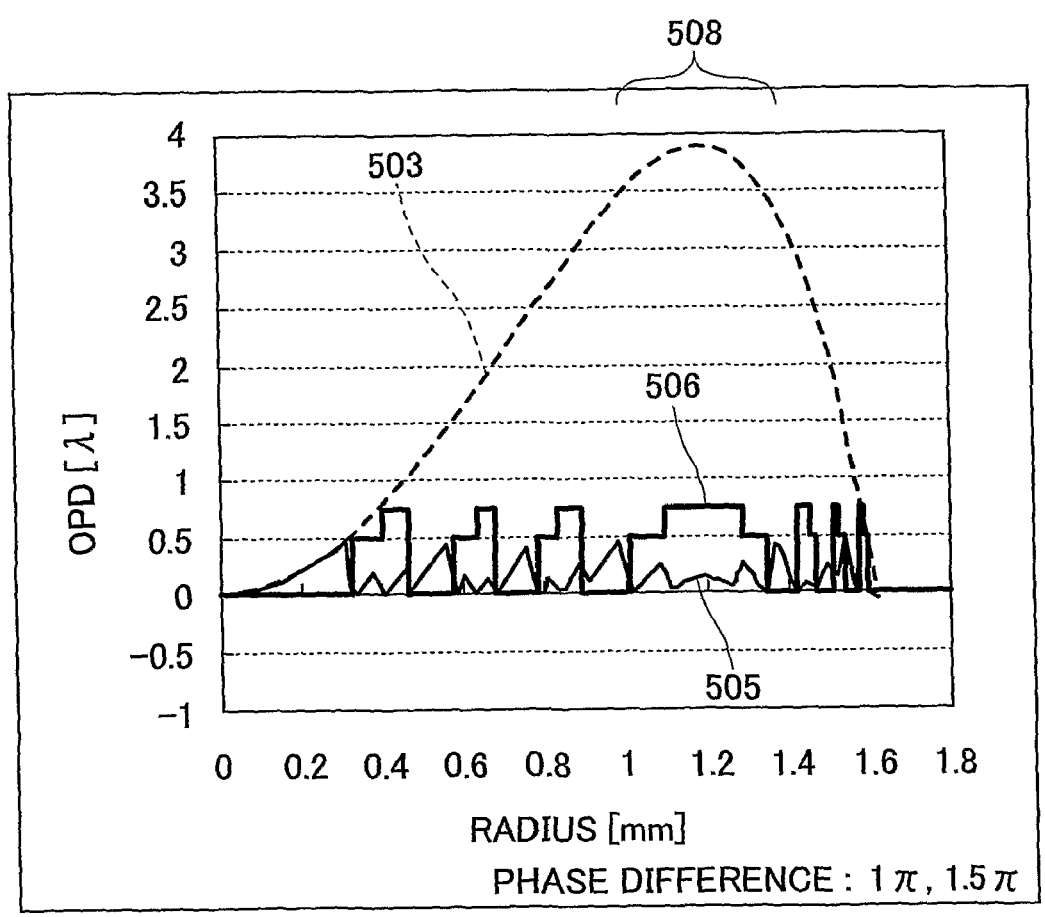
FIGS. 11A through 11C are diagrams for describing aberration correction according to a fourth embodiment of the present invention, where
Figure 11B:
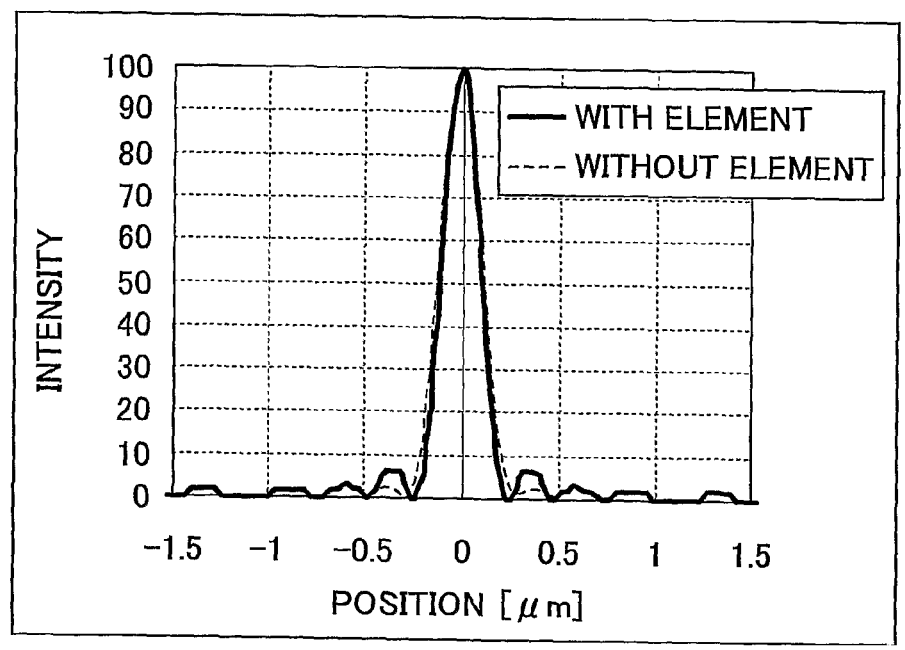
Figure 11C:
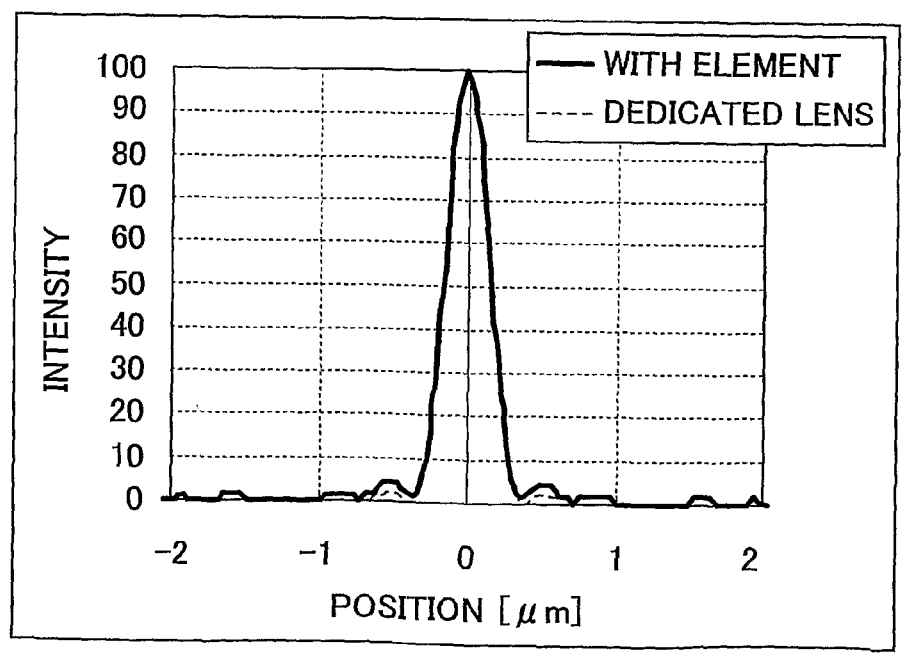

FIGS. 11A through 11C are diagrams for describing aberration correction according to a fourth embodiment of the present invention. FIG. 11A illustrates the phase difference of the wavefront in a case that the shape 506 applies a phase difference of 1π and 1.5π with respect of the wavelength, similar to the first embodiment. In the fourth embodiment, the region 508 where the wavefront phase is most advanced is not the region on the phase shifter surface where the steps are d=0, i.e., where a phase difference of an integral multiple of 2π is applied. Furthermore, the high order aberration of the BD spot is large, and therefore the peak intensity is lower compared to the first embodiment. The BD spot is illustrated in FIG. 11B and the HD spot is illustrated in FIG. 11C. These diagrams say that the spots are favorably focused on the corresponding substrates having the thicknesses t1 and t2. In order to improve the efficiency for light utilization as in the first embodiment, the region 508 where the phase of the wavefront is most advanced is to be the annular region where the applied phase difference is an integral multiple of 2π.

<Fifth Embodiment>

Figure 12A:
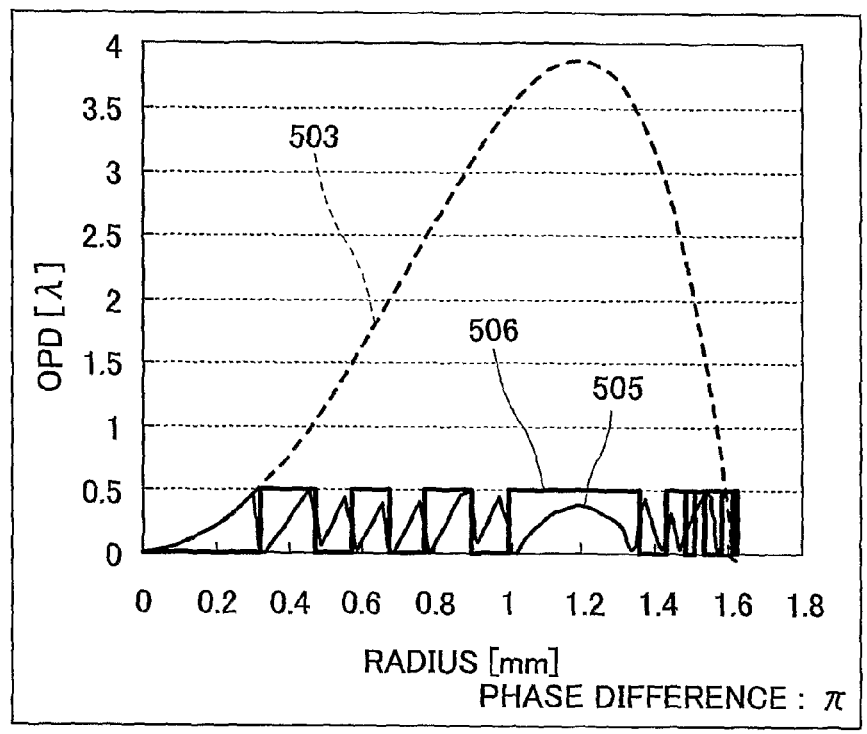
FIGS. 12A and 12B are diagrams for describing aberration correction according to a fifth embodiment of the present invention, where
Figure 12B:
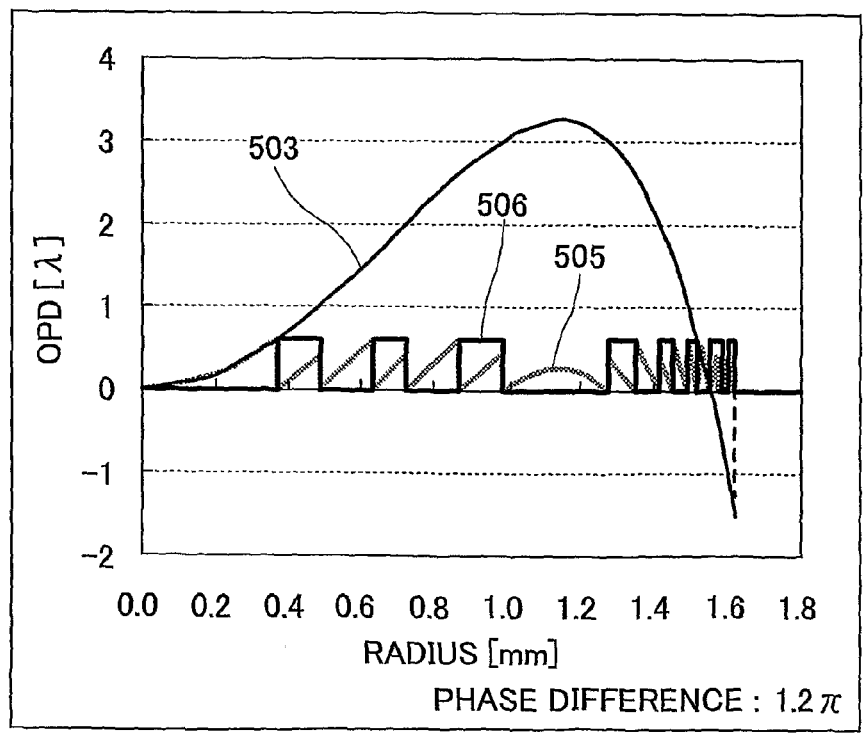

FIGS. 12A and 12B are diagrams for describing aberration correction according to a fifth embodiment of the present invention. FIG. 12A illustrates a wavefront shape where the steps are configured to apply a phase difference of 1π, and FIG. 12B illustrates a wavefront shape where the steps are configured to apply a phase difference of 1.2π. In FIG. 12A, where a phase difference of 1π is applied, all of the steps are 0.38 μm. In FIG. 12B, where a phase difference of 1.2π is applied, all of the steps are 0.456 μm. Therefore, the pitch can be increased, and also the fabrication process can be facilitated. Moreover, when etching is performed for fabrication, the number of steps can be reduced.

<Sixth Embodiment>

Figure 13:
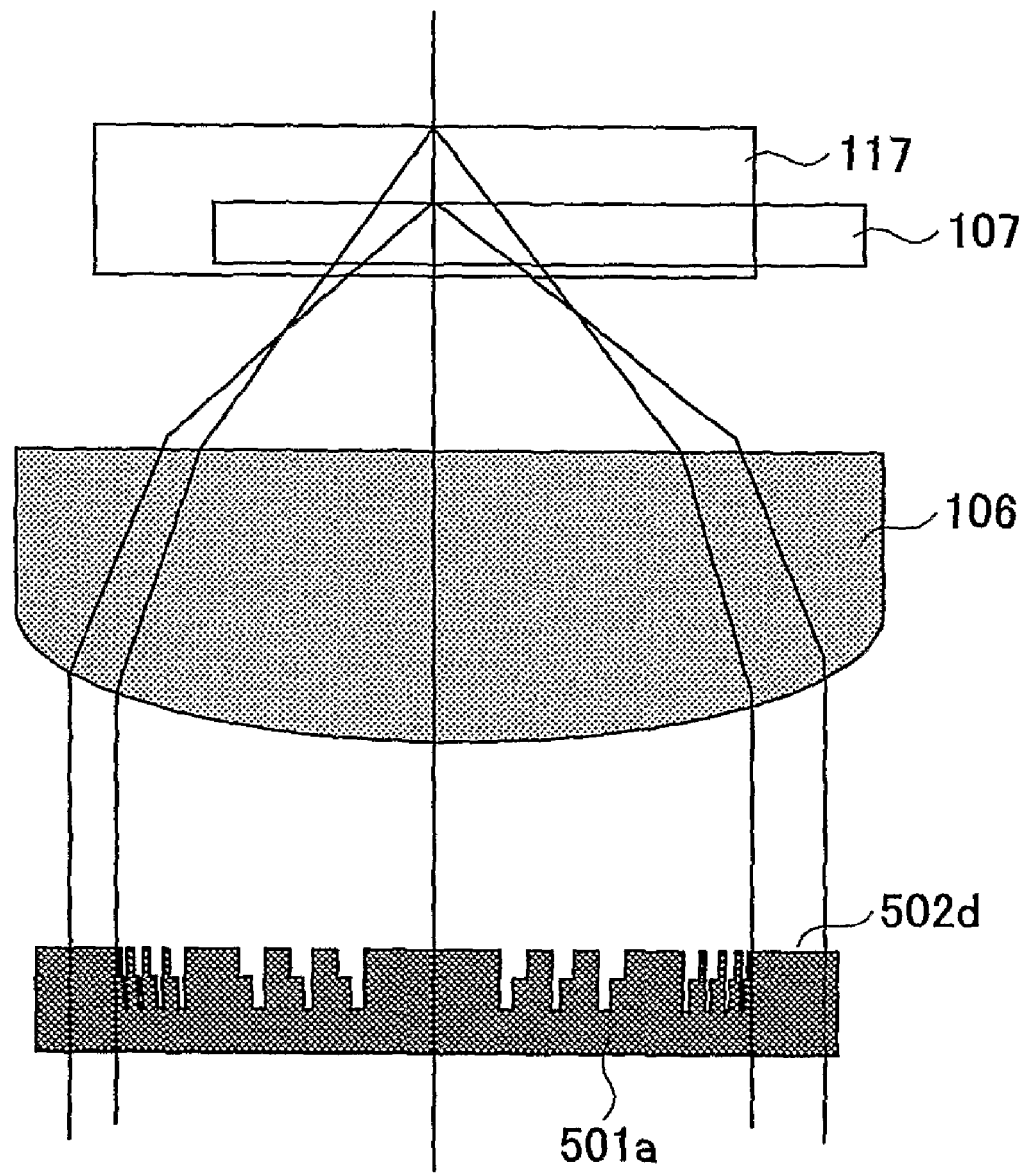
FIG. 13 is an enlarged cross-sectional view of an aberration correction unit and an object lens according to a sixth embodiment of the present invention.
Figure 14:
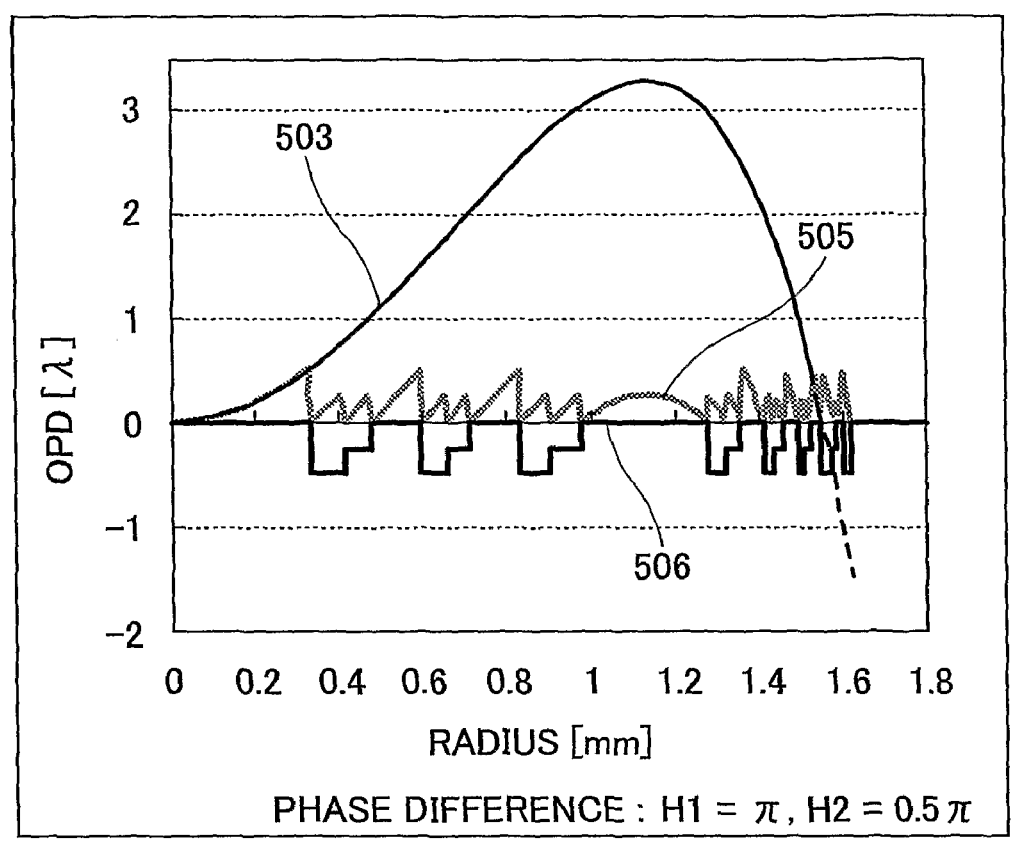
FIG. 14 is for describing aberration correction according to the sixth embodiment of the present invention.

FIG. 13 is an enlarged cross-sectional view of an aberration correction unit and an object lens according to a sixth embodiment of the present invention, and FIG. 14 illustrates the phase difference of the wavefront for correcting the aberration. In the sixth embodiment, the phase difference to be applied is the same as that illustrated in FIG. 4A of the first embodiment. In the sixth embodiment, the heights of the steps in a phase shifter surface 502d of an aberration correction unit 501a are highest at the optical axis, and are low in the annular region for applying a phase difference. The steps have heights of H1=−0.19 μm and H2=−0.38 μm, which satisfy 0<|H1| and |H2|,... ≦π (where H1,H2,... <0), and therefore the steps can be smaller than those of the first embodiment. By making the steps smaller, the amount of fluctuation can be mitigated even when the refractive index changes or the phase shifter surface 502d expands due to fluctuations in the wavelength or the temperature.

<Seventh Embodiment>

Figure 15:
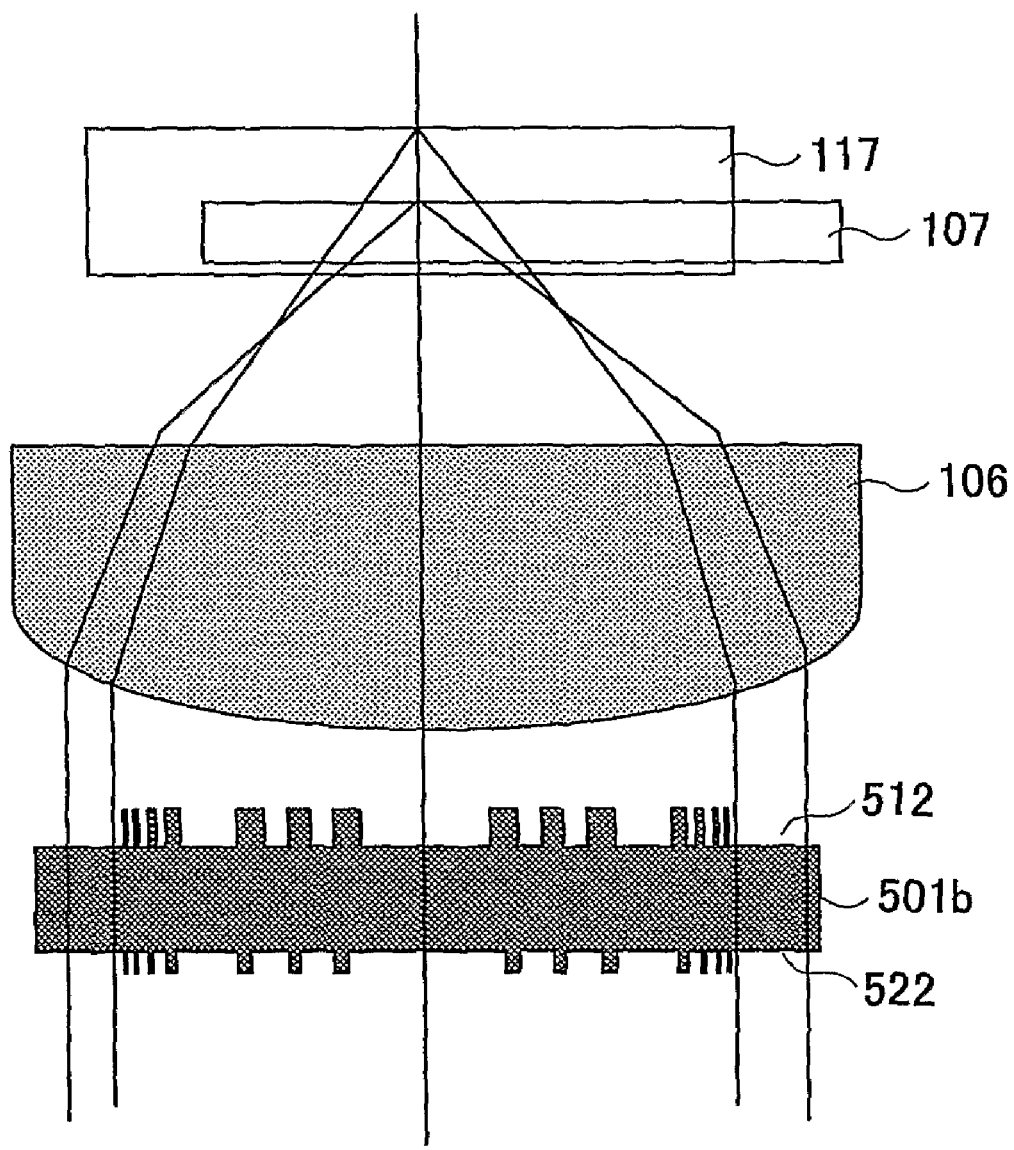
FIG. 15 is an enlarged cross-sectional view of an aberration correction unit and an object lens according to a seventh embodiment of the present invention.
Figure 16:
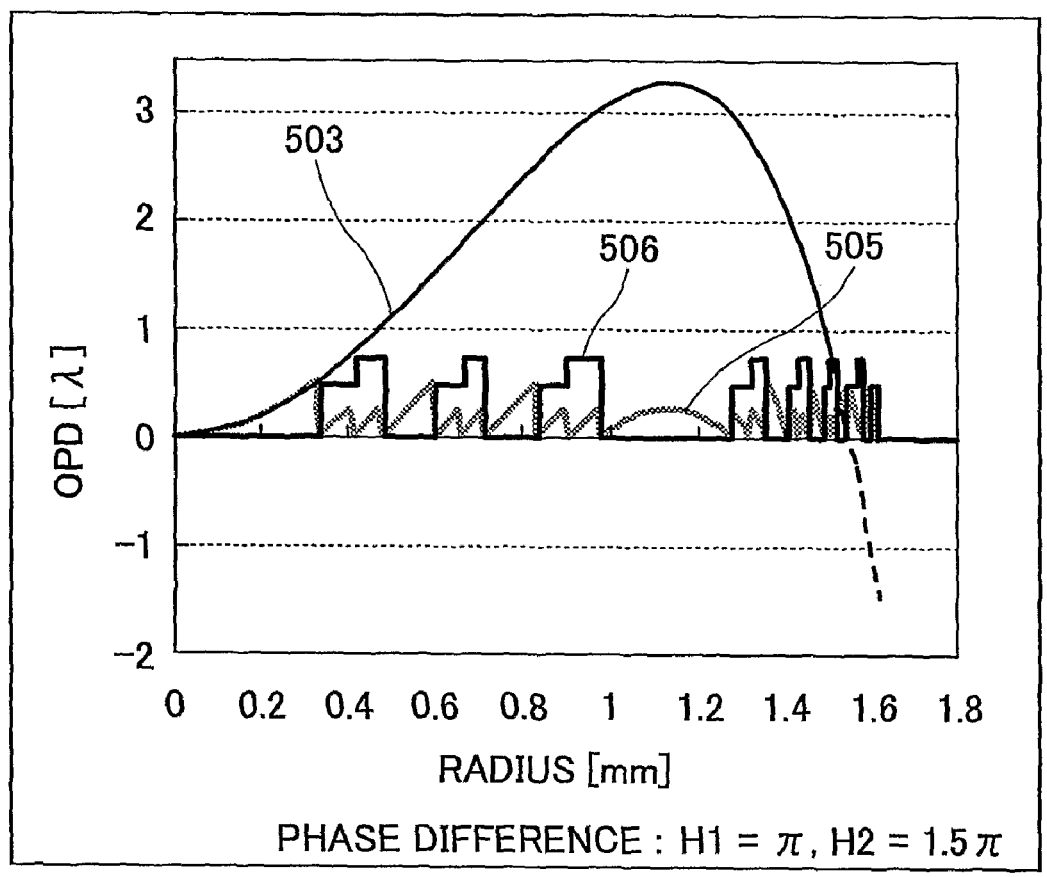
FIG. 16 is for describing aberration correction according to the seventh embodiment of the present invention.

FIG. 15 is an enlarged cross-sectional view of an aberration correction unit and an object lens according to a seventh embodiment of the present invention, and FIG. 16 illustrates the phase difference of the wavefront for correcting the aberration. In the seventh embodiment, the phase difference to be applied is the same as that illustrated in FIG. 4A of the first embodiment. In the seventh embodiment, steps are formed on both sides (first and second phase shifter surfaces 512 and 522) of a substrate acting as an aberration correction unit 501b. The steps formed on the same side have equal heights. Therefore, manufacturing is facilitated and costs are reduced, particularly in a case of using a glass material.

<Eighth Embodiment>

Figure 17:
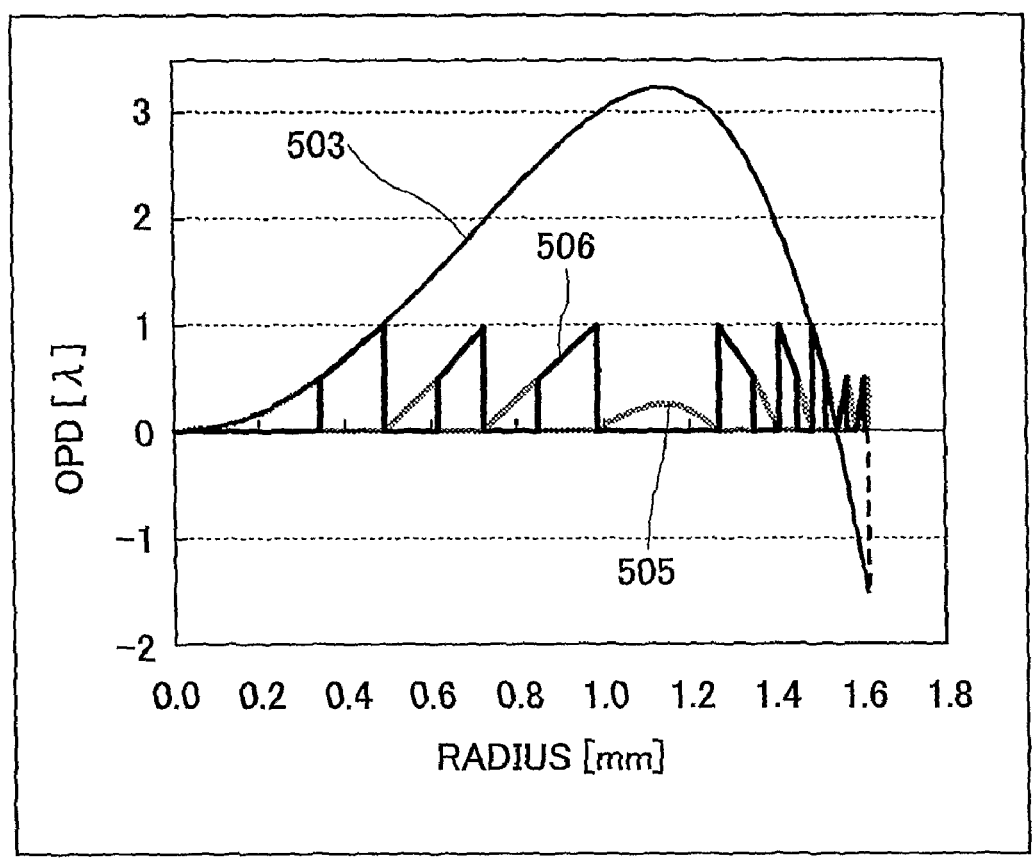
FIG. 17 is for describing aberration correction according to an eighth embodiment of the present invention.
Figure 18:
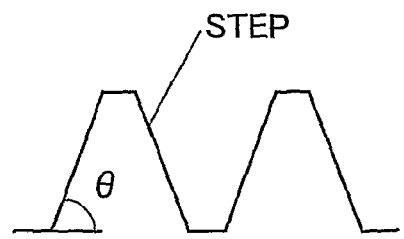
FIG. 18 is for describing a phase step shape according to the eighth embodiment of the present invention.

FIG. 17 is illustrates a phase difference in a wavefront for aberration correction according to an eighth embodiment of the present invention. The shape 506 of the phase difference to be applied is trapezoidal. The steps from 1π through 2π have a continuous shape, which is closer to the shape of the wavefront shape 503 of HD before correction. Therefore, the shape of the wavefront shape 505 after correction becomes more continuous, and the wavefront aberration becomes smaller. The rectangular or staircase-like phase step shape referred to in the embodiments of the present invention can be trapezoidal, as in the eighth embodiment. Furthermore, as shown in FIG. 18, the tilt θ of each step can be less than 90 degrees.

<Ninth Embodiment>

Figure 19:
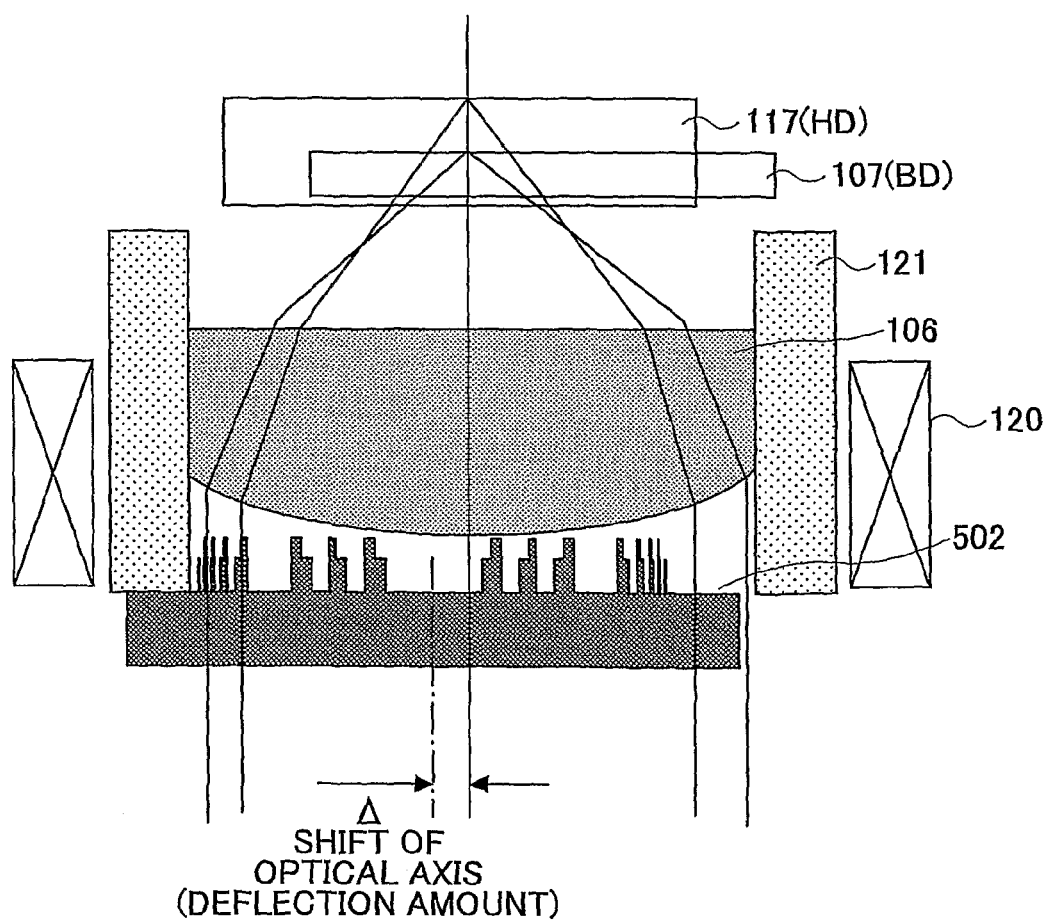
FIG. 19 illustrates the deflection of a phase shifter surface and an object lens according to a ninth embodiment of the present invention.

A ninth embodiment according to the present invention pertains to a method of assembling an aberration correction unit. If the optical axis of the phase shifter surface 502 formed on the aberration correction unit 501 and the light axis of the object lens 106 were deflected when these elements are being assembled, coma-aberration would occur, and favorable spots would not be attained. The optical axis of the phase shifter surface corresponds to the center of concentric circles dividing into plural regions having different heights in the optical axial direction, of the optical pickup. FIG. 19 illustrates the deflection of the phase shifter surface 502 and the object lens 106. In FIG. 19, Δ denotes the deflection amount.

Figure 20A:
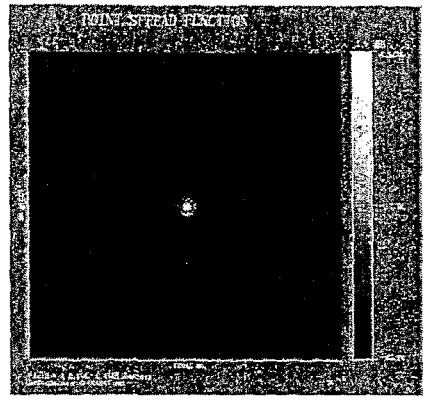
FIGS. 20A, 20B, and 20C illustrate spots of the second optical recording medium (HD) when the deflection amounts $\Delta$ are 0 µm, 20 µm, and 50 µm, respectively, in the ninth embodiment of the present invention.
Figure 20B:
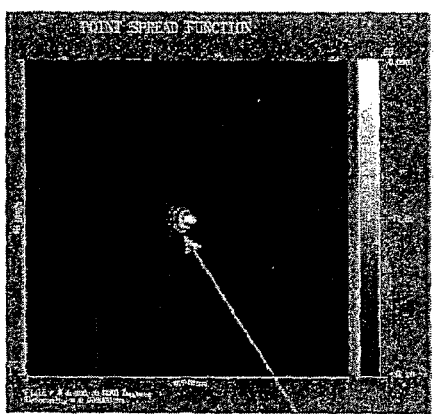
Figure 20C:
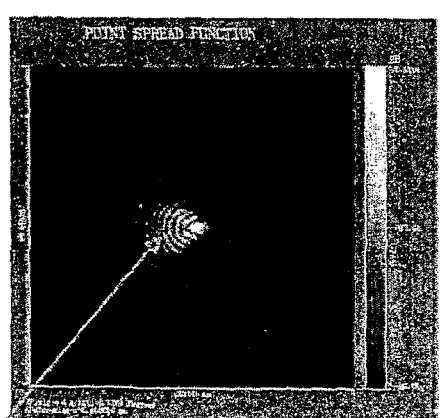

FIGS. 20A, 20B, and 20C illustrate HD spots when the deflection amounts Δ are 0 μm, 20 μm, and 50 μm, respectively. The intensities are provided by a logarithmic display. When deflection occurs, coma 610, which is an asymmetric side lobe, is generated around the center peak of the HD spot, as shown in FIGS. 20B and 20C. The position of the aberration correction unit is adjusted in the optical axial direction and the vertical direction in such a manner that the side lobe becomes axially symmetric. The position of the aberration correction unit is fixed where the coma 610 disappears. An axially symmetric state is where the asymmetric state is eliminated, and therefore, an ellipsoidal spot can be included. By making such adjustments, the optical axis of the aberration correction unit and the optical axis of the object lens can be easily made to coincide with each other. Therefore, it is possible to attain a spot whose coma aberration is corrected, as shown in FIG. 20A.

Figure 21:
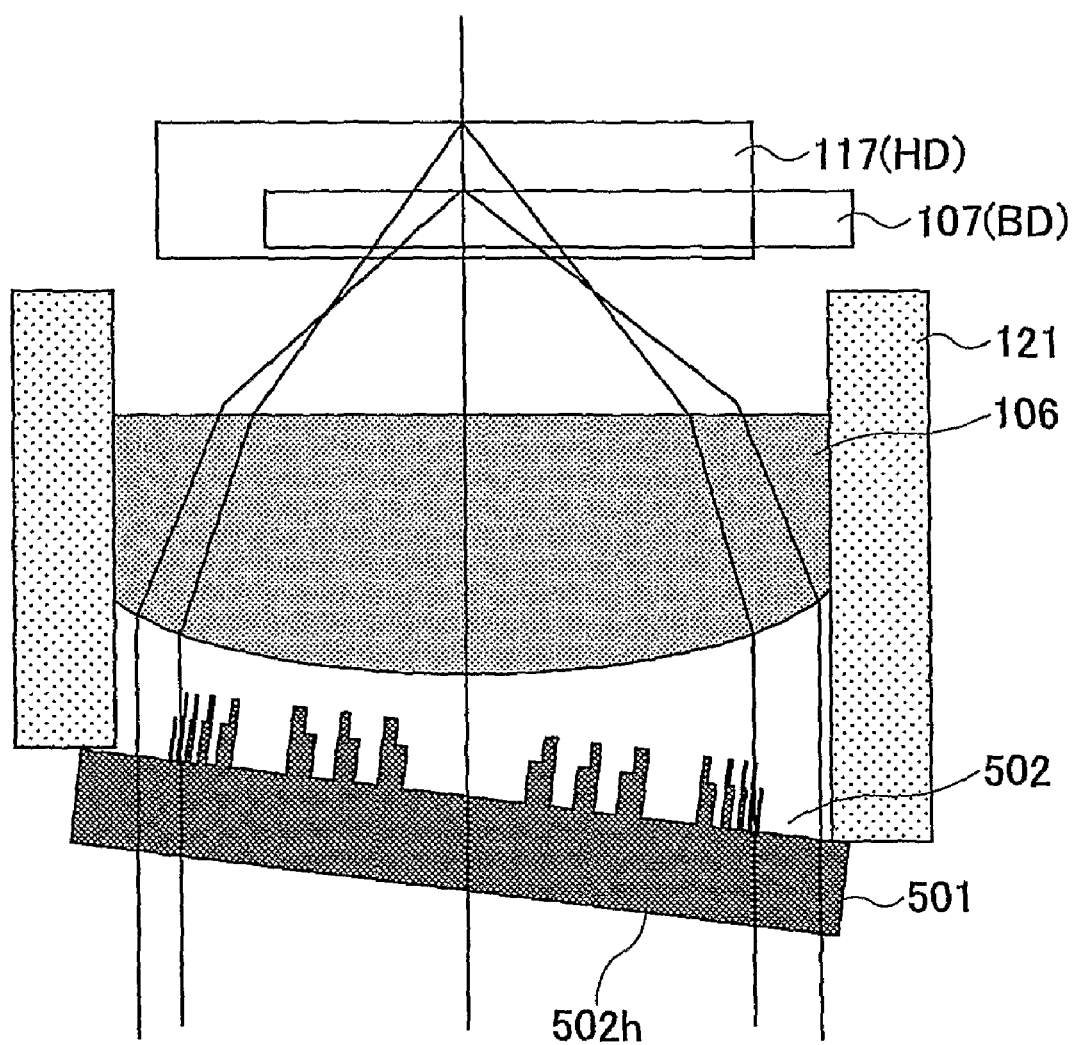
FIG. 21 illustrates a case of combining the aberration correction unit and the object lens according to the ninth embodiment of the present invention in such a manner that the optical axes are tilted.

FIG. 21 illustrates a case of combining the aberration correction unit 501 and the object lens 106 in such a manner that the optical axes are tilted. Among the light beams incident on the aberration correction unit 501, some of the light beams are reflected from an opposite surface 502h of the phase shifter surface 502. If the optical axis of the object lens 106 and the optical axis of the aberration correction unit 501 are arranged in parallel, some of the reflected light beams will return to the semiconductor laser 101 shown in FIG. 1, which may degrade the reproduction signals. Accordingly, in the ninth embodiment, the optical axis of the object lens 106 and the optical axis of the aberration correction unit 501 are tilted with respect to each other, so that the light beams reflected from the opposite surface 502h can be prevented from returning to the semiconductor laser 101.

However, if the aberration correction unit 501 and the object lens 106 are combined in such a manner as to be tilted as shown in FIG. 21, coma-aberration and astigmatism occur. This aberration can be corrected by adjusting the aberration correction unit 501 in a vertical direction with respect to the optical axis of the object lens 106, as described above. When the aberration correction unit 501 is tilted, a side lobe that is asymmetric with respect to the spot intensity distribution will appear as shown in FIGS. 20B and 20C. The aberration can be corrected by adjusting the aberration correction unit 501 in the vertical direction with respect to the optical axis of the object lens 106 in such a manner that the shape of this side lobe becomes axially symmetric.

Figure 22:
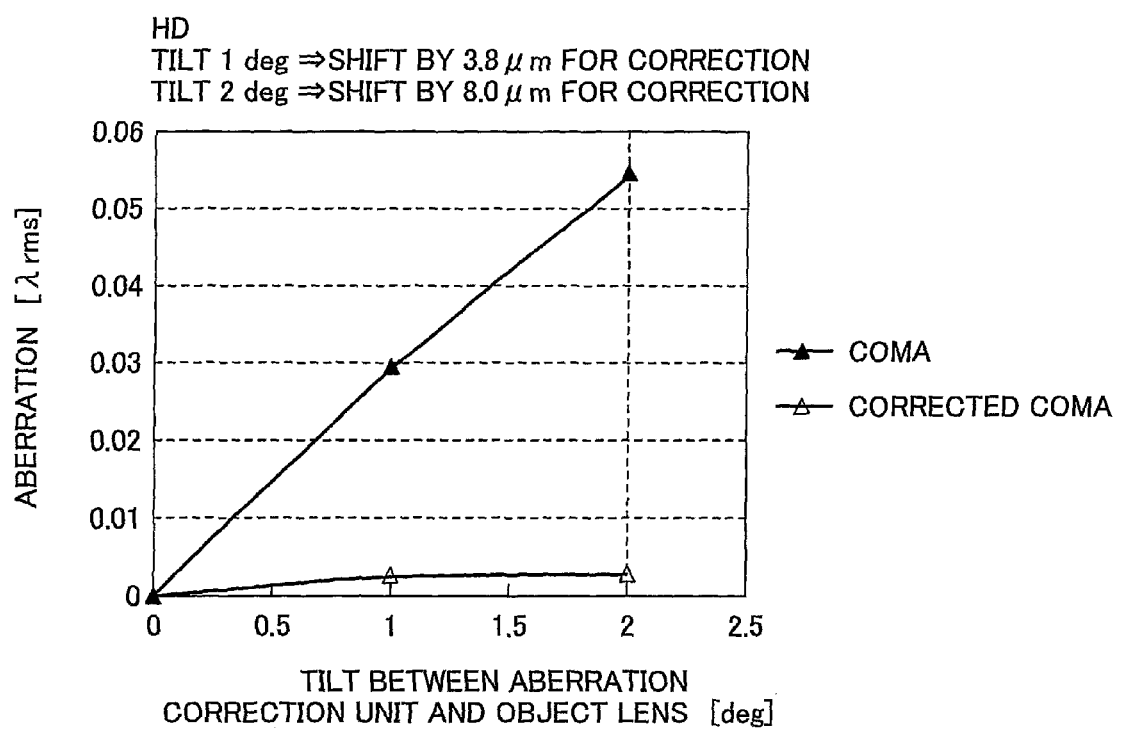
FIG. 22 illustrates the tilt between the optical axes of the aberration correction unit and the object lens according to the ninth embodiment of the present invention and properties before and after correcting the aberration via the substrate of the second optical recording medium (HD)

In FIG. 22, the horizontal axis represents the tilt between the optical axis of the aberration correction unit 501 and the optical axis of the object lens 106, and the vertical axis represents the aberration caused when the light beam is transmitted through the substrate of the second optical recording medium. FIG. 22 illustrates the values of coma-aberration before and after adjusting the aberration correction unit 501 in the vertical direction with respect to the optical axis. When the tilt angle is 1 degree, the optical axes are deflected by 3.8 μm, and when the tilt angle is 2 degrees, the optical axes are deflected by 8.0 μm. By adjusting the deflection amount in this manner, the aberration can be corrected, and favorable spots can be attained.

Furthermore, coma-aberration may be caused by a manufacturing error in the object lens, coma-aberration may be caused when the object lens is combined with the aberration correction unit in such a manner that the direction of a light beam incident on the object lens is tilted with respect to the optical axis of the object lens, and coma-aberration may be caused by a manufacturing error in the aberration correction unit. Any of these instances of coma-aberration can be corrected by adjusting the deflection amount between the optical axis of the phase shifter and the optical axis of the object lens such that the side lobe becomes axially symmetric. In this case, the optical axis of the phase shifter surface need not coincide with the optical axis of the object lens.

Furthermore, the aberration correction unit 501 can be fixed to the lens tube 121 shown in FIG. 21 by aerial adhesion or by adhering it with ultraviolet curing resin; however, the fixing method is not limited thereto. Moreover, when the aberration correction unit 501 is combined with the object lens 106 in a tilted manner as shown in FIG. 21, the incident light on the aberration correction unit 501 becomes an elliptic light beam as viewed from the phase shifter surface 502. Accordingly, the steps of the phase shifter surface 502 can be formed as concentric ellipses.

<Tenth Embodiment>

In an aberration correction unit according to a tenth embodiment of the present invention, the phase shifter surface is not made by forming air spaces on a substrate but by filling in the spaces with a material such as an adhesive.

Figure 23:
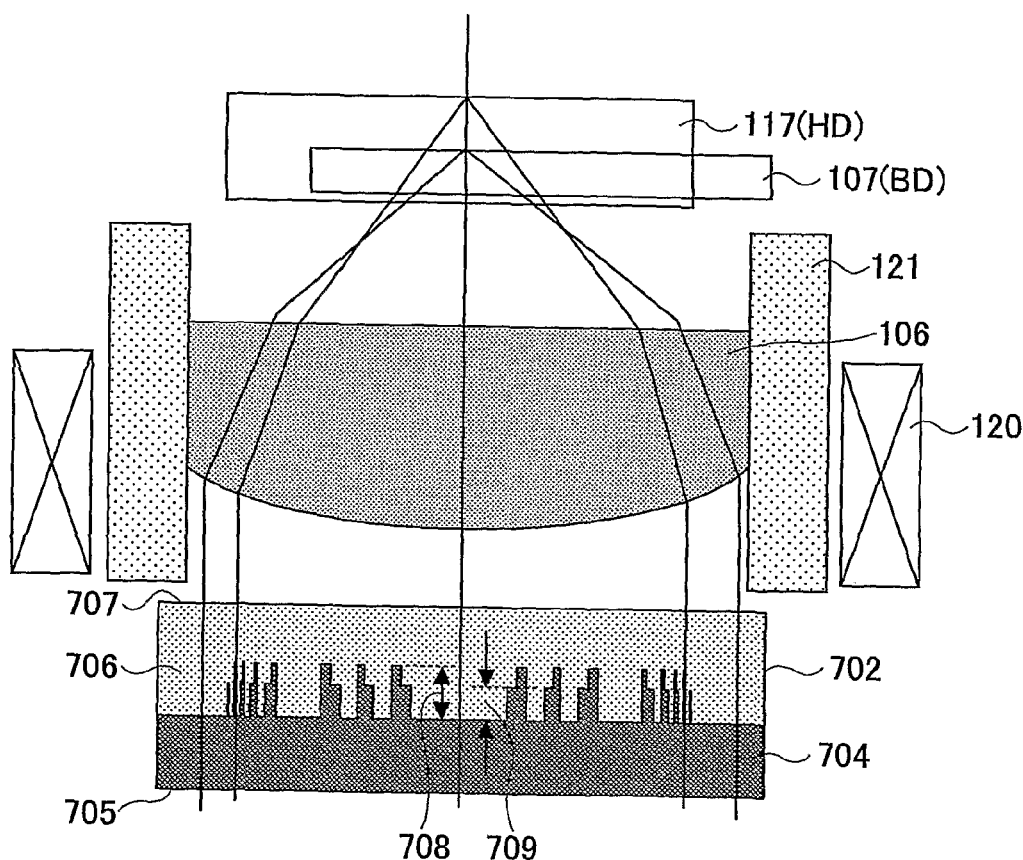
FIG. 23 illustrates an aberration correction unit according to a tenth embodiment of the present invention, in which the substrate with the phase shifter surface is filled with an adhesive layer.

FIG. 23 illustrates an aberration correction unit 702 in which a substrate 704 having the phase shifter surface is covered with an adhesive layer 706. Assuming that the substrate 704 is made of silica having a refraction index of n1=1.469247 in a wavelength of 408 nm and that the adhesive layer 706 has a refraction index of n2=1.414, a height 708 corresponding to the phase difference of 0.75λ is 5.539 μm, and a height 709 corresponding to a phase difference of 0.5λ is 3.693 μm.

Assuming that the substrate 704 is made of $Ta_2O_5$ that has a refractive index of n1=2.31263 in a wavelength of 408 nm and the adhesive layer 706 has a refractive index of n2=1.414, the height 708 corresponding to a phase difference of 0.75λ becomes 0.341 μm, and the height 709 corresponding to a phase difference of 0.5λ becomes 0.227 μm.

In such a configuration, an anti-reflection coating or an anti-reflection structure can be formed on a top surface 707 and a bottom surface 705 of the aberration correction unit 702, thereby improving the light utilization efficiency.

Figure 24:
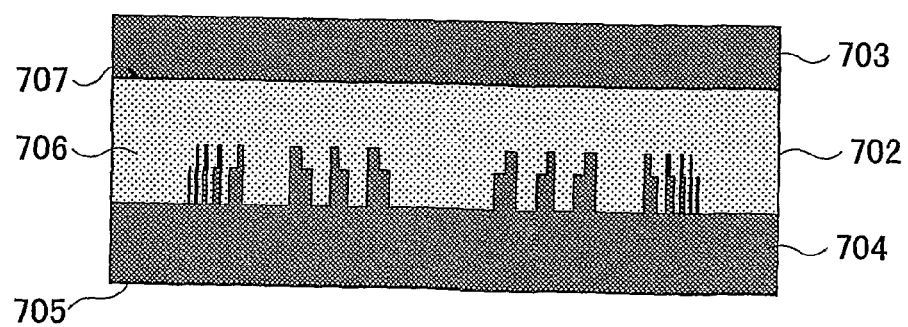
FIG. 24 illustrates the aberration correction unit according to the tenth embodiment of the present invention with another member provided on the top.

Furthermore, as shown in FIG. 24, when another material 703 is adhered onto the top surface 707 of the adhesive layer 706, the bottom surface 705 of the substrate 704 and the other material 703 have functions of a ¼ wave plate, a diffraction grating, a light polarizer, and a hologram element, so that the aberration correction unit 702 alone can have plural functions, which reduces the number of steps performed in the assembling procedure.

<Eleventh Embodiment>

Figure 25A:
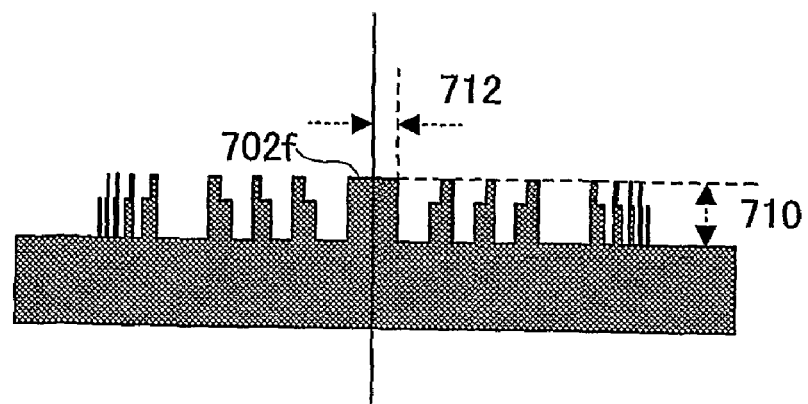
FIGS. 25A and 25B illustrate an aberration correction unit according to an eleventh embodiment of the present invention.
Figure 25B:
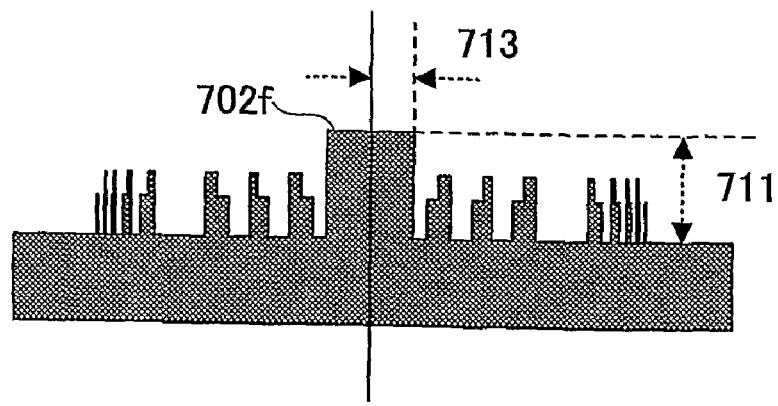

FIGS. 25A and 25B illustrate an aberration correction unit according to an eleventh embodiment of the present invention. The height of the uneven steps in the center region including the optical axis and the height of the uneven steps in the regions corresponding to numerical apertures NA1 to NA2 are different.

In FIG. 25A, a height 710 of the uneven steps of a center region 702f including an optical axis has a phase step of 1.5π in a wavelength of 405 nm. In FIG. 25B, a height 711 of the uneven steps of the center region 702f including an optical axis has a phase step of 2π in a wavelength of 405 nm. Furthermore, pitches 712 and 713 are 50 μm.

In the case of the phase step of 2π, the wavefront shapes of both BD and HD are the same as those of the first embodiment. In the case of the phase step of 1.5π, both BD and HD receive a phase difference of 0.5π. However, this has a small impact on the high order aberration caused by a phase difference of the center region 702f including the optical axial center, and therefore this does not affect the spot performance.

Figure 26:
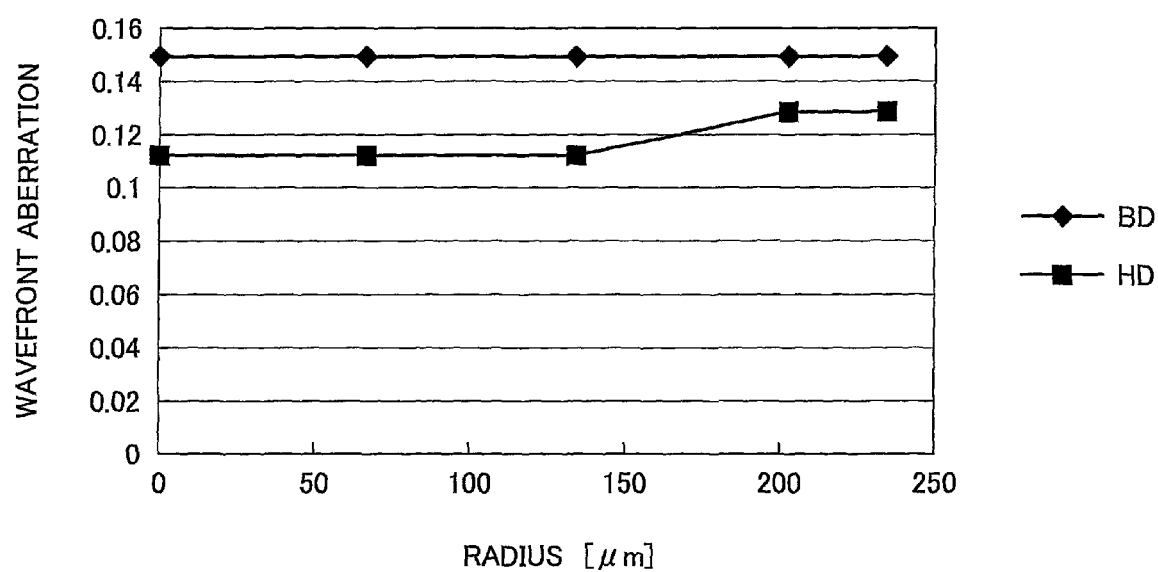
FIG. 26 illustrates the relationship between the uneven pitches in the region including the optical axis and the wavefront aberration.

FIG. 26 illustrates the relationship between the pitch 713 of the uneven steps in the region including the optical axis and the wavefront aberration. Components of this wavefront aberration are substantially high order aberration components, and components of the spherical aberration, the coma aberration, and the astigmatic aberration are less than or equal to 0.02 λrms. Thus, it can be understood that the wavefront aberration only increases to up to approximately 100 μm.

By providing steps near the optical axis as in the eleventh embodiment, the optical axial center of the phase shifter surface can be easily found, and adjustments can be easily made in combining the aberration correction unit with the object lens.

<Twelfth Embodiment>

Figure 27:
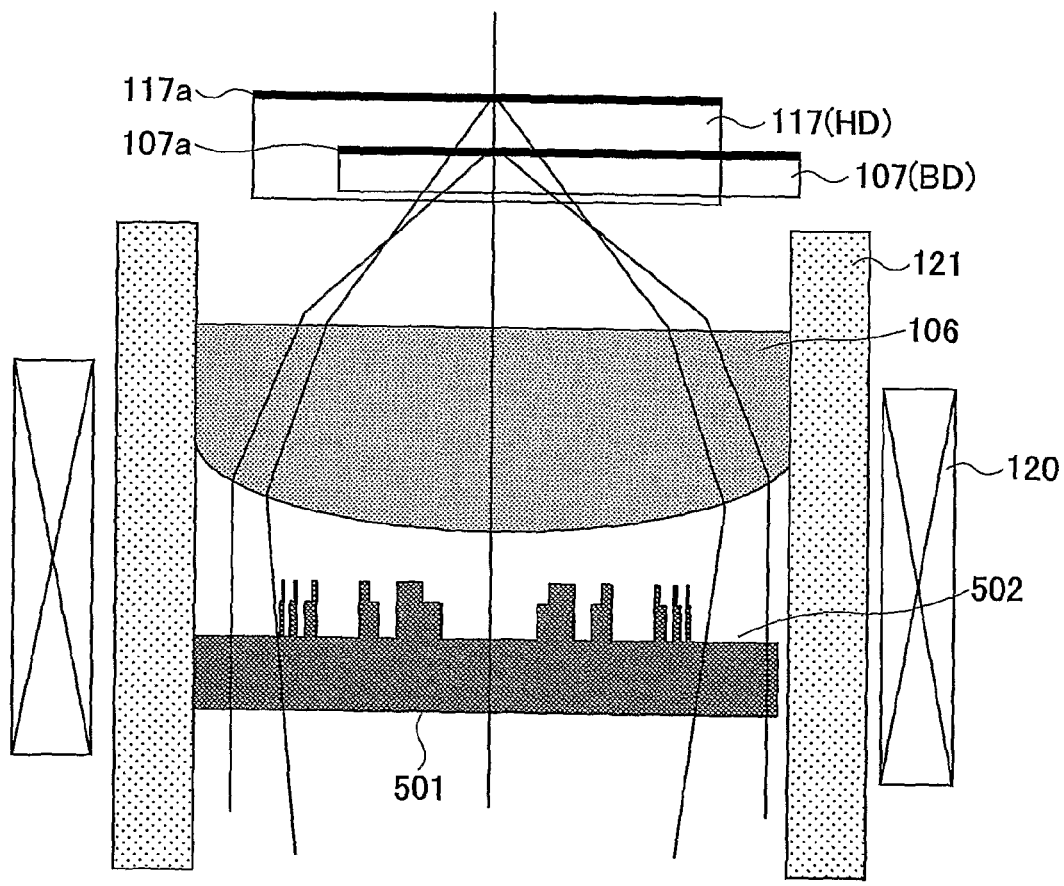
FIG. 27 illustrates an aberration correction unit according to a twelfth embodiment of the present invention using light beams of a finite system.

A twelfth embodiment of the present invention is a finite system, in which light beams from a light source enter the aberration correction unit 501 as divergent rays, when the light beams are focused onto the second optical recording medium (HD), as shown in FIG. 27.

The object lens 106 of the twelfth embodiment is aspherical on both sides as in the first embodiment, and is expressed by formula 2.

$$x = \frac{\frac{1}{r}R^2}{1 + \sqrt{1 - (1+\kappa)\frac{1}{r^2}R^2}} + AR^4 + BR^6 + CR^8 + DR^{10} + ER^{12} + FR^{14} + GR^{16} + HR^{18} + JR^{20} + \ldots \quad \text{(Formula 2)}$$

$$R = \sqrt{y^2 + z^2}$$

The surface data of each surface and each region are indicated in table 2.

TABLE 2

| SIDE NO. | TYPE 2 | CURVATURE RADIUS [mm] | SIDE INTERVAL [mm] | GLASS MATERIAL |
|---|---|---|---|---|
| FIRST SIDE | ASPHERICAL | 1.30900 | 2.0 | KVC80 |
| SECOND SIDE | ASPHERICAL | −9.99670 | | |

| ASPHERICAL CONSTANT | FIRST SIDE | SECOND SIDE |
|---|---|---|
| K | −0.613869 | −2164.451767 |
| A | 0.117967E−01 | 0.944631E−01 |
| B | 0.524119E−02 | −.730592E−01 |
| C | −.799497E−02 | −.208293E−01 |
| D | 0.972394E−02 | 0.337588E−01 |
| E | −.425032E−02 | −.948609E−02 |
| F | −.318867E−03 | 0 |
| G | 0.889351E−03 | 0 |
| H | −.222870E−03 | 0 |

The material of the glass forming the object lens 106 is KVC80 manufactured by Sumita Optical Glass, Inc. The effective pupil radius of the object lens 106 is 1.5 mm.

When focusing the light beam onto the second optical recording medium, the movable unit (coil) 111 moves the collimation lens 102 in the optical axial direction, and turns the light beam into a diverging ray. When the light beam is to be focused on the first optical recording medium, the movable unit 111 moves the collimation lens 102 in the optical axial direction, and turns the light beam into collimated light. The unit for changing the diverging angle is not limited to the above. It is also possible to separately provide a positive lens and a negative lens, and move one or both of the positive lens and the negative lens in the optical axial direction.

Figure 28A:
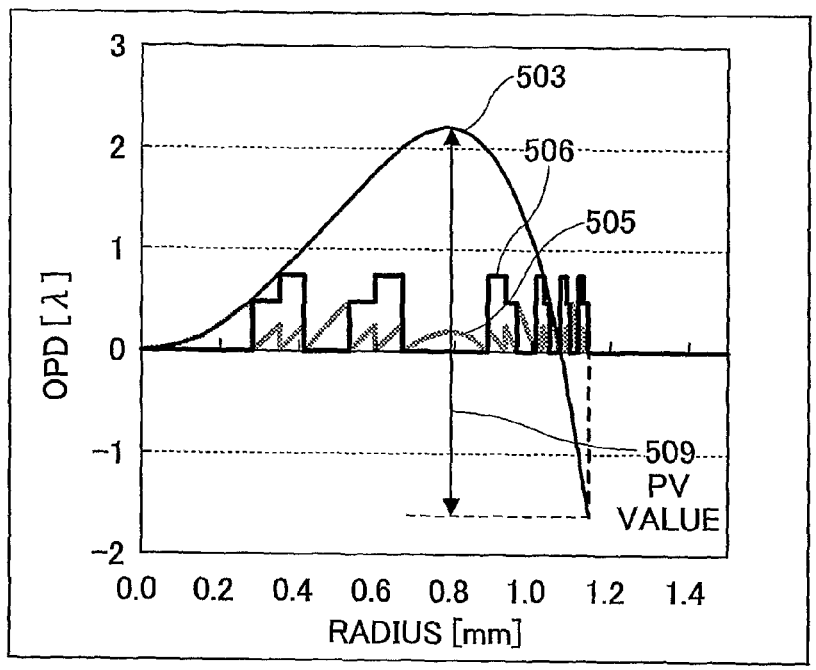
FIGS. 28A and 28B illustrate aberration correction according to the twelfth embodiment of the present invention, where
Figure 28B:
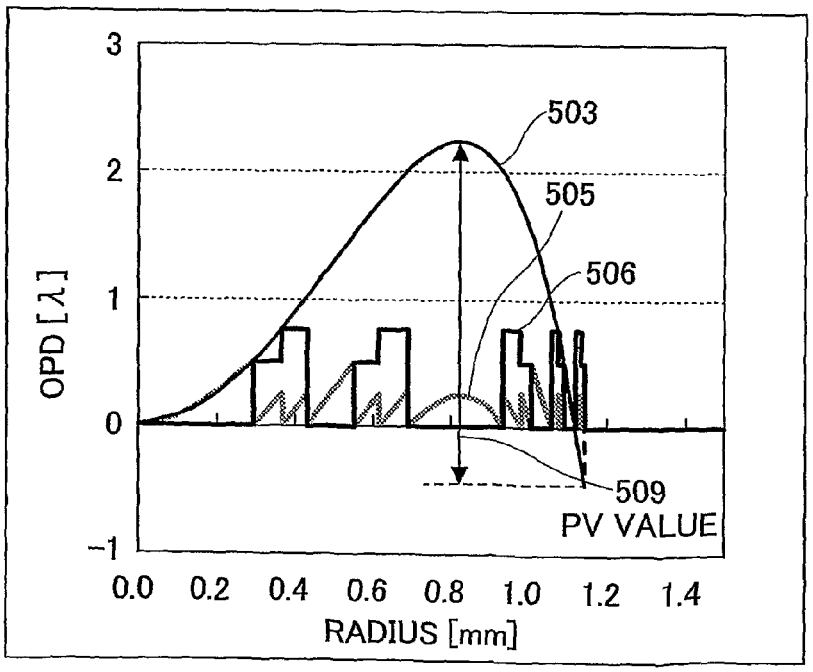

In FIGS. 28A and 28B, the horizontal axis represents the pupil radius position of the object lens, and the vertical axis represents the phase (λ). In FIGS. 28A and 28B, 503 denotes the wavefront shape of the aberration that is caused by the difference in the substrate thickness of the second optical recording medium (HD). The wavefront shapes 503 shown in FIGS. 28A and 28B are formed when diverging rays with object distances of 70 mm and 50 mm, respectively, are focused on the second optical recording medium (HD). Compared to a case where collimated light of an infinite system is incident, it is possible to reduce a PV value 509 that corresponds to the difference between the maximum value and the minimum value of the wavefront shape. Therefore, the number of uneven steps can be reduced, so that the pitch is increased.

With such a finite system, it is possible to facilitate the fabrication process, and mitigate light quantity loss caused by diffraction that is caused by phase steps.

<Thirteenth Embodiment>

Figure 29:
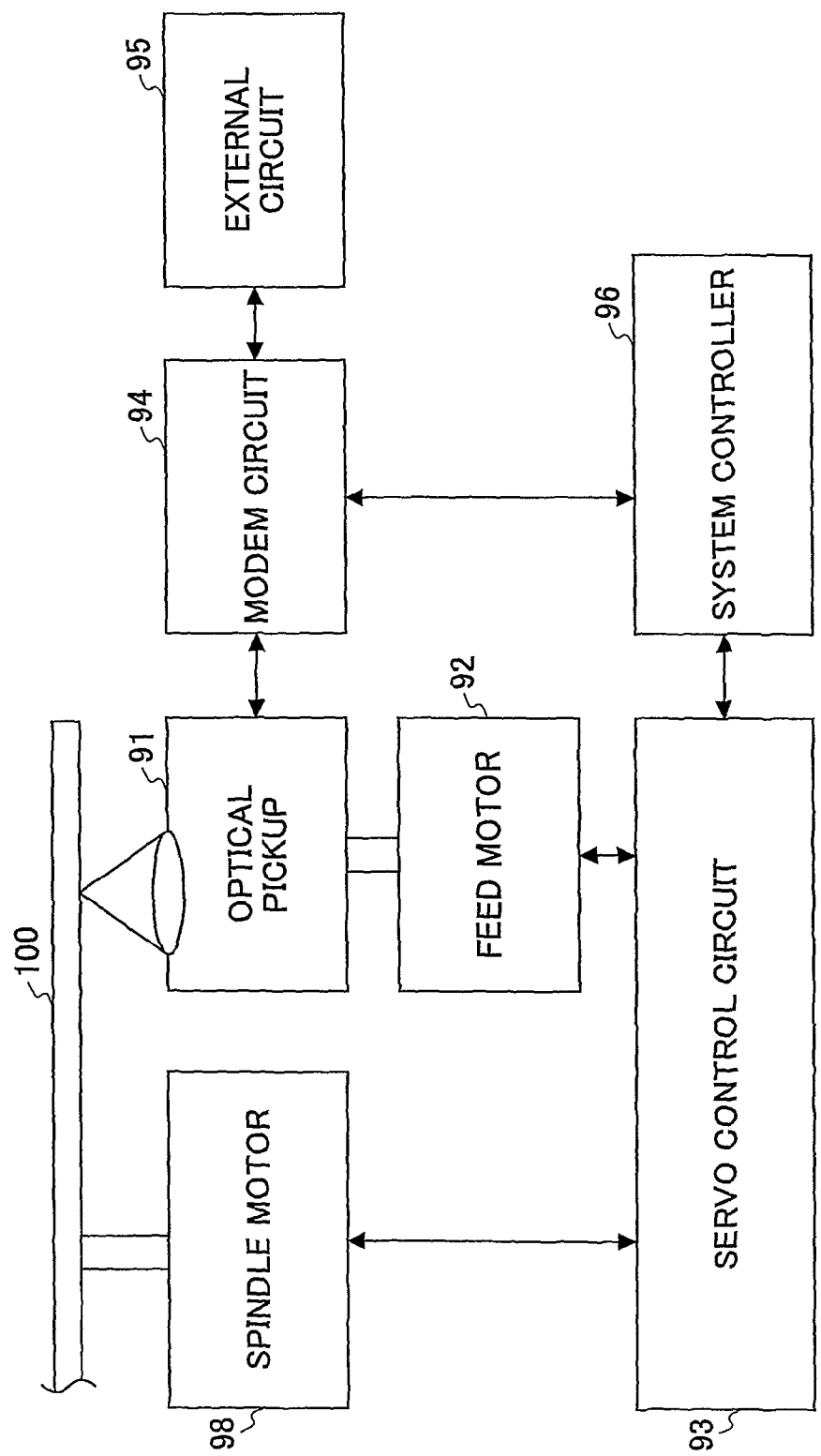
FIG. 29 is a schematic diagram of an optical information processing device according to a thirteenth embodiment of the present invention.
Figure 30:
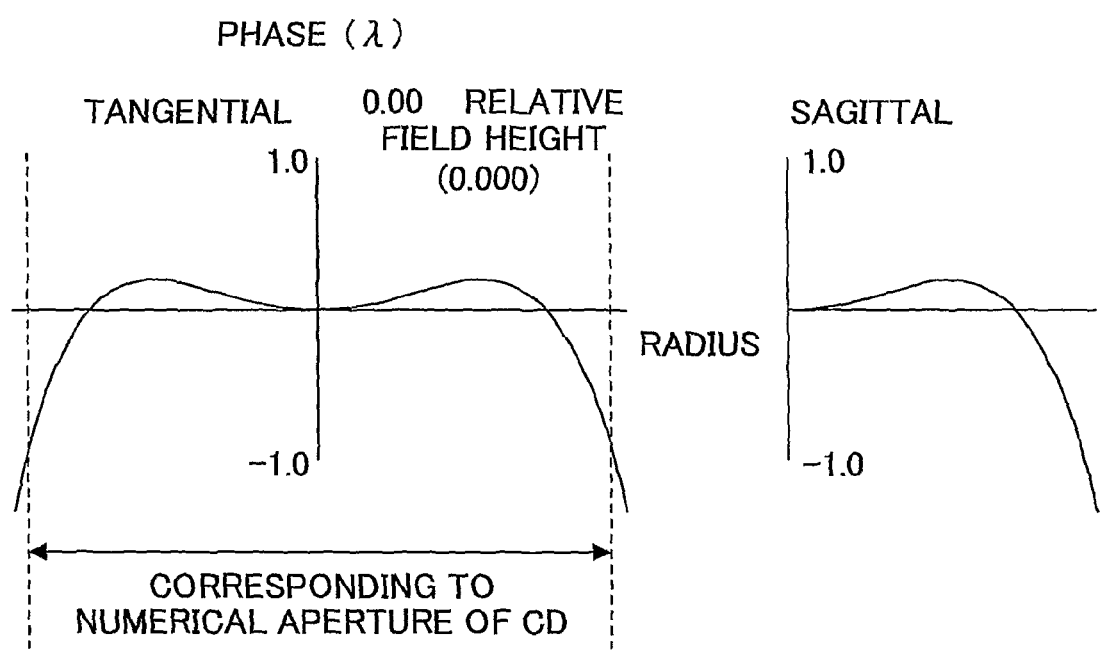
FIG. 30 illustrates the wavefront shape of aberration when an object lens for DVDs and a phase difference adjusting element are provided before a transparent substrate of a CD.
Figure 31:
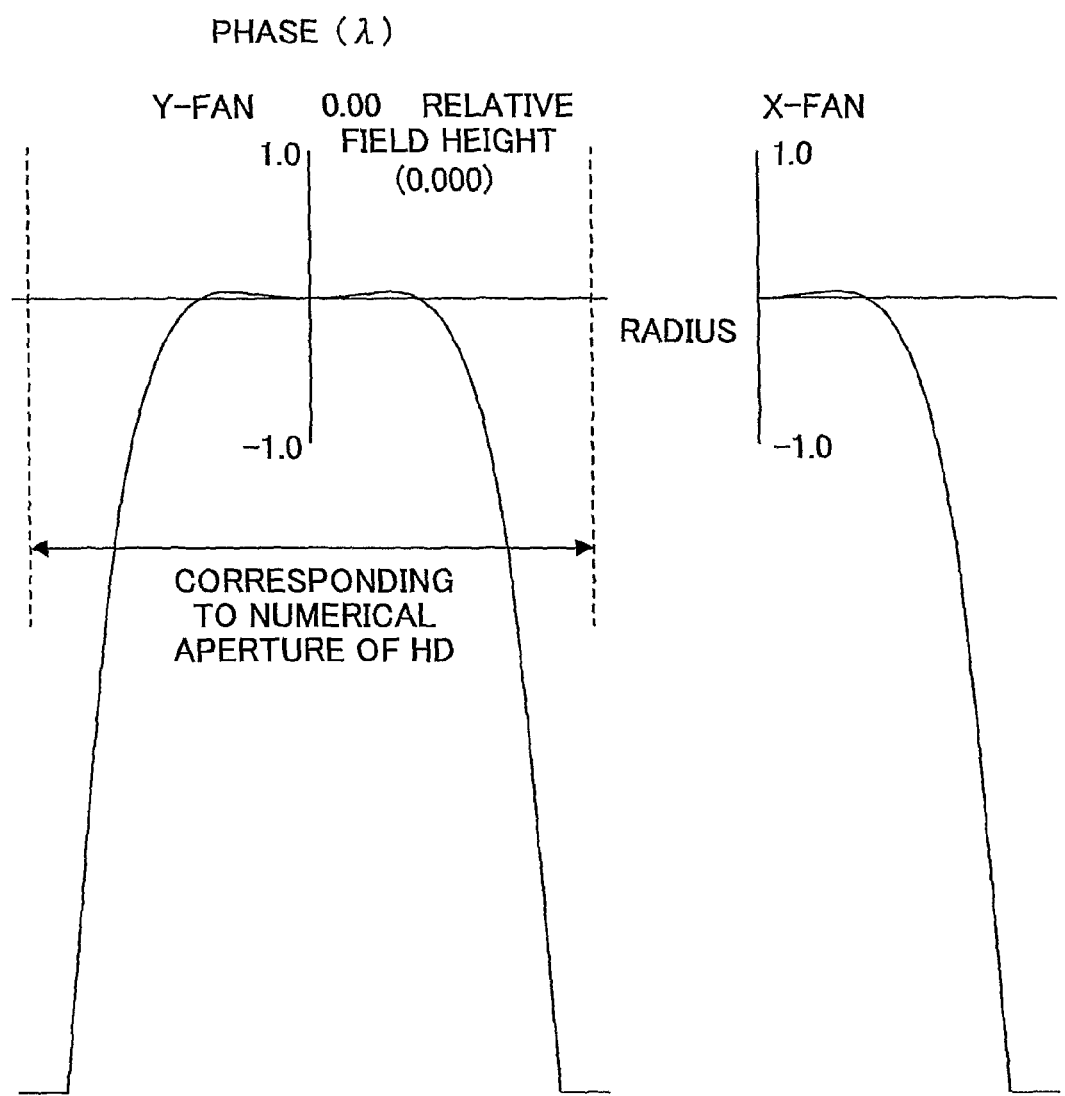
FIG. 31 illustrates the wavefront shape of aberration when an object lens with a high NA of approximately 0.85 is used in combination with short wavelength light.

FIG. 29 is a schematic diagram of an optical information processing device according to a thirteenth embodiment of the present invention. The thirteenth embodiment is one embodiment of the optical information processing device which uses any one of the optical pickups according to the first through twelfth embodiments to perform at least one of reproducing, recording, and erasing of information for an optical recording medium.

As shown in FIG. 29, the optical information processing device includes an optical pickup 91, a feed motor 92, and a spindle motor 98. These are controlled by a system controller 96 that controls all units of the optical information processing device. The optical pickup 91 is moved in the tracking direction by a control driving unit including the feed motor 92 and a servo control circuit 93. For example, to reproduce an optical recording medium 100, control signals are supplied from the system controller 96 to the servo control circuit 93 and a modem circuit 94.

The servo control circuit 93 rotates the spindle motor 98 at a set rotational speed and drives the feed motor 92.

The modem circuit 94 is supplied with focusing error signals and tracking error signals detected by an optical detector of the optical pickup 91, and position information indicating the position in the optical recording medium 100 that is being read. The focusing error signals and the tracking error signals are supplied to the servo control circuit 93 via the system controller 96.

The servo control circuit 93 drives the focusing coil of the actuator with the focusing control signals, and drives the tracking coil of the actuator with the tracking control signals. The low-pass components of the tracking control signals are supplied to the servo control circuit 93 via the system controller 96 to drive the feed motor 92. Accordingly, a feedback servo of a focusing servo, a tracking servo, and a feed servo are performed.

Furthermore, the position information indicating the position in the optical recording medium 100 that is being read is processed by the modem circuit 94 and supplied to the spindle motor 98 as spindle control signals; the spindle motor 98 is driven at a predetermined rotational speed according to the reproducing position on the optical recording medium 100, and then the actual reproduction is started. Then, the reproduction data that are processed and demodulated by the modem circuit 94 are transmitted outside via an external circuit 95.

In the case of recording data, the same procedures as those of the reproduction operation are performed up to performing the feedback servo on the focusing servo, the tracking servo, and the feed servo.

Control signals indicating the position in the optical recording medium 100 where to record the input data input via the external circuit 95, are supplied to the servo control circuit 93 and the modem circuit 94 from the system controller 96.

The servo control circuit 93 drives the spindle motor 98 at a predetermined rotational speed, and drives the feed motor 92 to move the optical pickup 91 to the information recording position.

The input signals input to the modem circuit 94 via the external circuit 95 undergo modulation based on a recording format, and are supplied to the optical pickup 91. The optical pickup 91 controls the modulation of an outgoing light beam and the outgoing light beam power, and starts to record information into the optical recording medium 100.

The type of the optical recording medium 100 can be determined based on reproduction data signals. It is also possible to determine the type of the optical recording medium 100 based on tracking servo signals or focus servo signals.

By providing the optical pickup including the phase shifter surface according to an embodiment of the present invention, in an optical information processing device dedicated to reproduction or an optical information processing device capable of both recording and reproducing information, it is possible to improve the precision in recording and/or reproducing information for optical recording media having different substrate thicknesses.

As described above, in the optical information processing device according to the thirteenth embodiment of the present invention, an optical pickup can form favorable focal spots on recording surfaces of two types of optical recording media (BD, HD) having different substrate thicknesses with the use of a single object lens 106. Accordingly, information signals can be recorded, reproduced, or erased for an optical recording medium by an optimum process.

An embodiment of the present invention provides an optical pickup that exhibits favorable spot performance by switching the numerical aperture and correcting the aberration with the use of only a phase shifter surface having good light utilization efficiency, and an optical information processing device that corrects aberration caused by a difference in the substrate thicknesses of two different types of optical recording media using light beams of the same wavelength emitted from a common light source, while mitigating efficiency degradation and maintaining high precision. These are useful as an optical focusing system for focusing light beams onto two types of optical recording media.

According to one embodiment of the present invention, an optical pickup for performing at least one of recording, reproducing, and erasing of information for at least two types of optical information recording media, includes an optical focusing system configured to focus a light beam from a light source onto a first recording layer of a first optical information recording medium via a first substrate having a first thickness t with the use of a first numerical aperture NA1, and onto a second recording layer of a second optical information recording medium via a second substrate having a second thickness t2 that is different from the first thickness t1 with the use of a second numerical aperture NA2, wherein the optical focusing system includes an object lens designed to focus the light beam onto the first recording layer of the first optical information recording medium, and an aberration correction unit including at least one phase shifter surface that is divided into plural regions in a concentric manner according to steps having uneven shapes with different heights in a light axial direction, which phase shifter surface is configured to apply a phase difference to the light beam from the light source; the plural regions include a center region including an optical axis, an outside annular region extending from a position of the first numerical aperture NA1 to a position of the second numerical aperture NA2, and a middle annular region positioned between the center region including the optical axis and the outside region; phase differences of the center region, the outside region, and the middle region are integral multiples of $2\pi$ with respect to a wavelength of the light beam; the steps having the uneven shapes are formed in a first annular region between the center region and the middle region and in a second annular region between the middle region and the outside region; and the steps are formed in such a manner as to reduce aberration that is caused by a difference between the first thickness t1 of the first substrate and the second thickness t2 of the second substrate. Thus, for the two types of optical information recording media, the aberration that is caused by the difference between the first thickness t1 of the first substrate and the second thickness t2 of the second substrate can be corrected with a single object lens and the phase shifter surface. The light beams used for the second optical information recording medium are those of the entire region within the second numerical aperture NA2. The light beams used for the first optical information recording medium are primarily those of the annular region that applies the phase difference that is an integral multiple of $2\pi$, among the outside annular region, the middle annular region, the center region, the first annular region between the center region and the middle region and the second annular region between the middle annular region and the outside annular region with the steps having the uneven shapes. With the use of such light beams, recording and reproducing operations can be performed, and the aperture can be switched according to the thickness of the substrate.

Additionally, in the optical pickup, a wavefront of the aberration caused by the difference between the first thickness t1 of the first substrate and the second thickness t2 of the second substrate includes a first position where a phase of the wavefront is most advanced in a radial direction; and the steps are formed on the phase shifter surface in such a manner that the first position is in the middle annular region that applies the phase difference that is an integral multiple of $2\pi$ with respect to the wavelength of the light beam from the light source. Thus, it is possible to increase the range corresponding to an integral multiple of $2\pi$ in the region within the second numerical aperture NA2 used for light beams for the first optical information recording medium.

Additionally, in the optical pickup, among the annular regions between the center region and the outside annular region that are divided according to the steps, the middle annular region has the widest radial width. Thus, it is possible to increase the range corresponding to an integral multiple of $2\pi$ in the region within the second numerical aperture NA2 used for light beams for the first optical information recording medium. Furthermore, it is possible to increase the region contributing to the spot focused on the first optical information recording medium, thereby mitigating side lobes.

Additionally, in the optical pickup, the steps formed on the phase shifter surface include staircase-like steps; and the staircase-like steps formed in the first annular region between the center region and the middle annular region, and the staircase-like steps formed in the second annular region between the middle annular region and the outside annular region, are inverted with respect to each other. Thus, it is possible to increase the range corresponding to an integral multiple of $2\pi$ in the region within the second numerical aperture NA2 used for light beams for the first optical information recording medium. Furthermore, it is possible to increase the region contributing to the spot focused on the first optical information recording medium, thereby mitigating side lobes.

Additionally, in the optical pickup, an absolute value of the phase difference H of the steps having the uneven shapes satisfies $|H|<2\pi$. Thus, it is possible to increase the range corresponding to an integral multiple of $2\pi$ in the region within the second numerical aperture NA2 used for light beams for the first optical information recording medium. Furthermore, it is possible to increase the region contributing to the spot focused on the first optical information recording medium, thereby mitigating side lobes. Moreover, the height of the steps having the uneven shapes can be reduced, so that manufacturing errors can be mitigated.

Additionally, in the optical pickup, the steps having the uneven shapes include plural types of steps, and assuming that the phase differences of the plural types of steps are H1, H2, ..., compared to the center region, one of the following conditions is satisfied: $\pi \leq$ H1, H2, ... $<2\pi$ (where H1, H2, ... >0); or $0<|$H1$|$, $|$H2$|$, ... $\leq \pi$ (where H1, H2, ... <0). Thus, it is possible to increase the range corresponding to an integral multiple of $2\pi$ in the region within the second numerical aperture NA2 used for light beams for the first optical information recording medium. Furthermore, it is possible to increase the region contributing to the spot focused on the first optical information recording medium, thereby mitigating side lobes. Moreover, aberration can be favorably corrected for the second optical information recording medium, thereby mitigating side lobes.

Additionally, in the optical pickup, the aberration correction unit includes a substrate; and the phase shifter surface is formed on one side of the substrate. Thus, on the other side of the substrate, an optical surface having another function can be provided, such as a ¼ wave plate. Furthermore, when the steps are fabricated by molding with the use of a die, only one type of die is required.

Additionally, in the optical pickup, the aberration correction unit includes a substrate; the phase shifter surface is formed on both sides of the substrate; and the steps formed on the same side of the substrate have the same height in an optical axial direction. Thus, the pitch of the steps can be wider, which facilitates fabrication.

Additionally, in the optical pickup, a center of concentric circles on the aberration correction unit dividing the plural regions having different heights in an optical axial direction and an optical axis of the object lens are relatively positioned in such a manner that side lobes of a spot intensity distribution focused on a recording surface of the first optical information recording medium or the second optical information recording medium become axially symmetric. This facilitates the process of locating the optical axis of the phase shifter surface and the optical axis of the object lens at coinciding positions.

Additionally, in the optical pickup, the aberration correction unit is combined with the object lens as a single unit; and the phase shifter surface is provided on a surface of the object lens. Thus, the size and cost can be reduced.

Additionally, in the optical pickup, a different material is used to fill in the steps of the phase shifter surface. Thus, it is possible to form anti-reflection structures on both sides of the aberration correction unit. Furthermore, the aberration correction unit can have plural different functions such as those of a wave plate, a light polarizer, and a diffraction grating.

Additionally, in the optical pickup, the light source includes a single light source having a wavelength of 390 nm through 420 nm. Thus, recoding and reproducing can be performed for two different types of information recording media with a single light source, thereby reducing size and cost.

According to one embodiment of the present invention, an optical information processing device for reproducing, recording, or erasing information by irradiating a light beam onto a recording surface of an optical information recording medium, includes any of the above-described optical pickups. Thus, a high-precision optical information processing device can be provided, in which aberration can be corrected for two different types of optical information recording media, efficiency loss can be mitigated, and size and cost can be reduced.

The present invention is not limited to the specifically disclosed embodiment, and variations and expansions may be made without departing from the scope of the present invention.

The present application is based on Japanese Priority Patent Application No. 2007-116376, filed on Apr. 26, 2007, and Japanese Priority Patent Application No. 2007-286017, filed on Nov. 2, 2007, the entire contents of which are hereby incorporated by reference.

The invention claimed is:

1. An optical pickup for performing at least one of recording, reproducing, and erasing of information for at least two types of optical information recording media, the optical pickup comprising:

an optical focusing system configured to focus a light beam from a light source onto a first recording layer of a first optical information recording medium via a first substrate having a first thickness t1 with the use of a first numerical aperture NA1, and onto a second recording layer of a second optical information recording medium via a second substrate having a second thickness t2 that is different from the first thickness t1 with the use of a second numerical aperture NA2, wherein:

the optical focusing system comprises an object lens designed to focus the light beam onto the first recording layer of the first optical information recording medium, and an aberration correction unit comprising at least one phase shifter surface that is divided into plural regions in a concentric manner according to steps having uneven shapes with different heights in a light axial direction, which phase shifter surface is configured to apply a phase difference to the light beam from the light source;

the plural regions comprise a center region comprising an optical axis, an outside annular region extending from a position of the first numerical aperture NA1 to a position of the second numerical aperture NA2, and a middle annular region positioned between the center region comprising the optical axis and the outside annular region;

phase differences of the center region, the outside annular region, and the middle annular region are integral multiples of $2\pi$ with respect to a wavelength of the light beam;

the steps having the uneven shapes are formed in a first annular region between the center region and the middle annular region and in a second annular region between the middle annular region and the outside annular region; and the steps are formed in such a manner as to reduce aberration that is caused by a difference between the first thickness t1 of the first substrate and the second thickness t2 of the second substrate.

2. The optical pickup according to claim 1, wherein:
a wavefront of the aberration caused by the difference between the first thickness t1 of the first substrate and the second thickness t2 of the second substrate comprises a first position where a phase of the wavefront is most advanced in a radial direction; and the steps are formed on the phase shifter surface in such a manner that the first position is in the middle annular region that applies the phase difference that is an integral multiple of $2\pi$ with respect to the wavelength of the light beam from the light source.

3. The optical pickup according to claim 1, wherein:
among the annular regions between the center region and the outside annular region that are divided according to the steps, the middle annular region has the widest radial width.

4. The optical pickup according to claim 1, wherein:
the steps formed on the phase shifter surface comprise staircase-like steps; and the staircase-like steps formed in the first annular region between the center region and the middle annular region, and the staircase-like steps formed in the second annular region between the middle annular region and the outside annular region, are inverted with respect to each other.

5. The optical pickup according to claim 1, wherein:
an absolute value of the phase difference H of the steps having the uneven shapes satisfies:

$|H| < 2\pi$.

6. The optical pickup according to claim 1, wherein:
the steps having the uneven shapes comprise plural types of steps, and assuming that the phase differences of the plural types of steps are H1, H2, . . . , compared to the center region, one of the following conditions is satisfied:

$\pi \leq H1, H2, \ldots < 2\pi$ (where $H1, H2, \ldots > 0$); or $0 < |H1|, |H2|, \ldots \leq \pi$ (where $H1, H2, \ldots < 0$).

7. The optical pickup according to claim 1, wherein:
the aberration correction unit comprises a substrate; and
the phase shifter surface is formed on one side of the substrate.

8. The optical pickup according to claim 1, wherein:
the aberration correction unit comprises a substrate;
the phase shifter surface is formed on both sides of the substrate; and
the steps formed on the same side of the substrate have the same height in an optical axial direction.

9. The optical pickup according to claim 1, wherein:
a center of concentric circles on the aberration correction unit dividing the plural regions having different heights in an optical axial direction and an optical axis of the object lens are relatively positioned in such a manner that side lobes of a spot intensity distribution focused on a recording surface of the first optical information recording medium or the second optical information recording medium become axially symmetric.

10. The optical pickup according to claim 1, wherein:
the aberration correction unit is combined with the object lens as a single unit; and
the phase shifter surface is provided on a surface of the object lens.

11. The optical pickup according to claim 1, wherein:
a different material is used to fill in the steps of the phase shifter surface.

12. The optical pickup according to claim 1, wherein:
the light source comprises a single light source having a wavelength of 390 nm through 420 nm.

13. An optical information processing device for reproducing, recording, or erasing information by irradiating a light beam onto a recording surface of an optical information recording medium, comprising:
the optical pickup according to claim 1.

* * * * *